(12) United States Patent
Ueda et al.

(10) Patent No.: US 7,148,636 B2
(45) Date of Patent: Dec. 12, 2006

(54) MOTOR DRIVE CONTROL APPARATUS

(75) Inventors: Mitsuo Ueda, Nishinomiya (JP); Hideki Nakata, Shijyounawate (JP); Makoto Yoshida, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 582 days.

(21) Appl. No.: 10/447,957

(22) Filed: May 30, 2003

(65) Prior Publication Data

US 2004/0108824 A1 Jun. 10, 2004

(30) Foreign Application Priority Data

May 31, 2002 (JP) .............................. 2002-160560

(51) Int. Cl.
*H02P 1/00* (2006.01)

(52) U.S. Cl. ...................... 318/114; 318/632; 318/611

(58) Field of Classification Search ................ 318/114, 318/119, 127–130, 135, 632, 638, 611
See application file for complete search history.

(56) References Cited

U.S. PATENT DOCUMENTS 5,142,872 A * 9/1992 Tipton ........................ 62/616
5,758,514 A * 6/1998 Genung et al. ............... 62/471
6,501,240 B1 12/2002 Ueda et al.
2001/0005320 A1 * 6/2001 Ueda et al. ................... 363/95

FOREIGN PATENT DOCUMENTS

| JP | 2-52692 | 2/1990 |
| JP | 10-243622 A | 11/1998 |
| JP | 2001193993 | 7/2001 |
| JP | 2002-155868 | 5/2002 |

* cited by examiner

*Primary Examiner*—Rina Duda
(74) *Attorney, Agent, or Firm*—Wenderoth, Lind & Ponack, L.L.P.

(57) ABSTRACT

A motor drive control apparatus for driving and controlling a linear vibration motor having a mover supported by a spring, with an AC current. The motor drive control apparatus includes a waveform creation unit for creating a comparative current waveform to be a reference of a driving current for the linear vibration motor based on the operating condition of the linear vibration motor, a current detector for detecting the driving current, and a controller for controlling a driving voltage of the linear vibration motor so that a difference between the comparative current waveform and a waveform of the current detected by the current detector becomes zero. The frequency of the driving current is controlled to be close to the resonance frequency of the linear vibration motor, based on the comparative current waveform. Accordingly, the driving frequency of the linear vibration motor can always be brought to the resonance frequency without using a sensor for detecting a displacement, speed, or acceleration of the mover, for example.

12 Claims, 15 Drawing Sheets

MOTOR DRIVE CONTROL APPARATUS

TECHNICAL FIELD OF THE INVENTION

The present invention relates to a motor drive control apparatus and, more particularly, to a motor drive control apparatus for controlling a linear vibration motor on the basis of its driving current, thereby to drive the motor with high efficiency.

BACKGROUND ART

Conventionally, linear motors have been used as sources of reciprocating vibrations (refer to Japanese Published Patent Application No. Hei.2-52692 (FIG. 1)). This literature discloses a linear motor for generating a reciprocating vibration (hereinafter referred to as a linear vibration motor).

The linear vibration motor is constructed as a single-phase sync motor having a mover comprising a rod-shaped permanent magnet, and a stator comprising an electromagnet. The electromagnet is obtained by winding a coil around both ends of a U-shaped iron core.

An output voltage from an AC power supply is converted into a full-wave rectified voltage having a frequency twice as high as a frequency of the AC power supply voltage by a full-wave rectifying circuit. When the full-wave rectified voltage is supplied to the coil of the linear vibration motor, the mover reciprocates to generate vibrations.

When generating vibrations by the reciprocating motion of the mover as described above, a strong magnetic power is needed. In the linear vibration motor, the mover is supported by a spring so as to form a spring vibration system including the mover, and this spring vibration system is vibrated at a frequency (resonance frequency) that matches the natural frequency of the spring vibration system, whereby energy necessary for driving the linear vibration motor can be reduced.

However, in the above-described method of driving the linear vibration motor at a frequency that matches the natural frequency of the spring vibration system, when a load is applied to the linear vibration motor, the amplitude of the reciprocating motion of the mover is not stable.

On the other hand, there has been proposed a method for driving and controlling a linear vibration motor, in which at least one of displacement, speed, and acceleration of a mover of the linear vibration motor is detected, and supply of power to an electromagnetic coil of the motor is adjusted according to a result of detection (refer to Japanese Published Patent Application No. Hei.10-243622 (FIG. 1)). In this method, even when the natural frequency (resonance frequency) varies for some reason such as load fluctuations, power supply to the coil is adjusted so that the linear vibration motor is continuously driven in the resonance state, on the basis of the displacement, speed, or acceleration of the mover.

In the above-described linear vibration motor drive control method, however, the load applied to the linear vibration motor is extremely large, and thereby the amplitude, speed, or acceleration of the mover is significantly reduced. When detection of displacement, speed, or acceleration of the mover with a sensor becomes impossible, the linear vibration motor cannot be driven in the resonance state, resulting in a significant reduction in driving efficiency.

Furthermore, in the linear vibration motor drive control method, since a sensor for detecting displacement of the mover, for example, must be incorporated in the linear vibration motor, the volume of the linear vibration motor is increased by the volume of the sensor, and furthermore, operation reliability of the sensor must be secured under severe operating conditions such as temperature.

SUMMARY OF THE INVENTION

The present invention is made to solve the above-described problems. Therefore, an object of the present invention to provide a motor drive control apparatus which can efficiently drive a linear vibration motor at a resonance frequency or a frequency close to the resonance frequency, regardless of load fluctuations, without using a sensor for detecting displacement, speed, or acceleration of a mover of the linear vibration motor.

According to a first aspect of the present invention, a motor drive control apparatus is provided for driving and controlling a linear vibration motor having a stator and a mover, where the mover is supported by a spring so as to form a spring vibration system including the mover. This apparatus comprises: a voltage output unit for outputting an AC driving voltage to the linear vibration motor; a current detector for detecting a driving current supplied to the linear vibration motor; a current waveform creation unit for creating a first AC current waveform to be a reference of the driving current, on the basis of the operating conditions of the linear vibration motor; and a controller for controlling the driving voltage of the linear vibration motor which is output from the voltage output unit, so as to reduce a difference between the first AC current waveform and a second AC current waveform which is a result of detection by the current detector. The controller adjusts a frequency of the AC driving current to be close to a resonance driving frequency of the linear vibration motor, according to the first AC current waveform. Therefore, the driving frequency of the linear vibration motor can always be brought to the resonance frequency or a frequency close to the resonance frequency, without using a position sensor for detecting the position of the mover or the like.

Thereby, drive control for driving the linear vibration motor can be realized with high efficiency regardless of load fluctuations, without the necessity of incorporating a sensor, which undesirably leads to an increase in size of the linear vibration motor, and unnecessary restrictions such as securing operation reliability of the sensor.

Furthermore, since the process of adjusting the frequency of the driving current of the linear vibration motor is carried out on the basis of the driving current of the linear motor, the detected driving current of the linear vibration motor can be used as it is for the drive control, and therefore, arithmetic processing for the detected driving current is not necessary.

According to a second aspect of the present invention, in accordance with the motor drive control apparatus of the first aspect, the controller adjusts the amplitude value or effective value of the first AC current waveform so that the amplitude value or effective value of the second AC current waveform is kept constant, and simultaneously, adjusts the frequency of the second AC current waveform so that the amplitude value or effective value of the first AC current waveform becomes maximum. Therefore, control of the driving frequency of the linear vibration motor can be carried out with stability.

According to a third aspect of the present invention, in accordance with the motor drive control apparatus of the second aspect, the controller drives and controls the linear vibration motor by repeatedly performing a voltage determining process for determining the driving voltage of the linear vibration motor on the basis of a difference between the first AC current waveform and a second AC current waveform, a first current adjusting process for adjusting the first AC current waveform, and a second current adjusting process for adjusting the second AC current waveform, respectively. The first current adjusting process has a cycle that is longer than or equal to a cycle with which the voltage determining process is repeated, and adjusts the amplitude value or effective value of the first AC current waveform so that the amplitude value or effective value of the second AC current waveform is kept constant. The second current adjusting process has a cycle that is longer than or equal to a cycle with which the first current adjusting process is repeated, and adjusts the frequency of the second AC current waveform so that the amplitude value or effective value of the first AC current waveform becomes maximum. Therefore, control of the driving frequency of the linear vibration motor can be carried out with stability and improved followability.

According to a fourth aspect of the present invention, in accordance with the motor drive control apparatus of the third aspect, the first current adjusting process changes a target value of the amplitude value or effective value of the second AC current waveform that is kept constant, in accordance with the operating conditions of the linear vibration motor. Therefore, drive control of the linear vibration motor in accordance with the performance required of the linear vibration motor can be carried out.

According to a fifth aspect of the present invention, in accordance with the motor drive control apparatus of the first aspect, the controller adjusts the frequency of the second AC current waveform so that the amplitude value or effective value of the second AC current waveform approaches a value that is half the amplitude value or effective value of the first AC current waveform, while keeping the amplitude value or effective value of the first AC current waveform constant. Therefore, control of the driving frequency of the linear vibration motor can be carried out with stability, and furthermore, the linear vibration motor can always be driven with highest efficiency in accordance with the operating conditions of the linear vibration motor.

According to a sixth aspect of the present invention, in accordance with the motor drive control apparatus of the fifth aspect, the controller drives and controls the linear vibration motor by repeatedly performing a voltage determining process for determining a driving voltage of the linear vibration motor on the basis of a difference between the first AC current waveform and a second AC current waveform, and a current adjusting process for adjusting the second AC current waveform, respectively. The current adjusting process has a cycle that is longer than or equal to a cycle with which the voltage determining process is repeated, and adjusts the frequency of the second AC current waveform so that the amplitude value or effective value of the second AC current waveform approaches a value that is half the amplitude value or effective value of the first AC current waveform, while keeping the amplitude value or effective value of the first AC current waveform constant. Therefore, control of the driving frequency of the linear vibration motor can be carried out with stability and improved followability.

According to a seventh aspect of the present invention, in accordance with the motor drive control apparatus of the sixth aspect, the current adjusting process changes a target value of the amplitude value or effective value of the first AC current waveform that is kept constant, in accordance with the operating conditions of the linear vibration motor. Therefore, drive control of the linear vibration motor in accordance with the performance required of the linear vibration motor can be carried out.

According to an eighth aspect of the present invention, an air conditioner is provided that has first and second heat exchangers which form a circulation path for a refrigerant, and a compressor which has a cylinder and a piston, and circulates the refrigerant in the circulation path by reciprocating motions of the piston. The air conditioner includes a linear vibration motor for making the piston reciprocate. The motor has a stator and a mover, which is supported with a spring so as to form a spring vibration system including the mover. The air conditioner also includes a motor drive control unit for driving and controlling the linear vibration motor. The motor drive control unit is a motor drive control apparatus according to any one of the first to seventh aspects. Therefore, friction loss in the compressor is reduced as compared with an air conditioner using a compressor having a rotation-type motor as a power source, and further, sealability for sealing a high-pressure refrigerant and a low-pressure refrigerant in the compressor is enhanced, resulting in an increase in efficiency of the compressor.

Further, in the compressor using the linear vibration motor according to the present invention, since friction loss is reduced, the amount of use of lubricating oil that is indispensable for the compressor using the rotation-type motor can be significantly reduced. Thereby, the amount of waste oil which needs recycling or the like can be reduced, and the amount of refrigerant to be filled in the compressor can be reduced because the amount of refrigerant that dissolves into the oil is reduced, resulting in a contribution to conservation of the global environment.

Furthermore, since the inside of the compressor has a high temperature and high pressure and the compressor is filled with chemical substances such as oil and refrigerant, when a position sensor for detecting the position of the mover or the like is employed, reliability of the sensor becomes a great problem. In the present invention, however, the frequency of the AC current as the driving current of the linear vibration motor is determined so that the supply current or supply voltage to the linear vibration motor becomes maximum, under the state where the amplitude value of the AC current is maintained at the target amplitude value. Therefore, the linear vibration motor can be efficiently driven at the resonance frequency, without using a sensor for detecting displacement, speed, or acceleration of the mover, for example.

As a result, drive control for driving the linear vibration motor can be realized with high efficiency regardless of load fluctuations in the compressor, without the necessity of incorporating a sensor, which undesirably leads to increases in size and cost of the compressor, and unnecessary restrictions such as securing operation reliability of the sensor.

According to a ninth aspect the present invention, a refrigerator is provided that has first and second heat exchangers which form a circulation path for a refrigerant, and a compressor which has a cylinder and a piston, and circulates the refrigerant in the circulation path by reciprocating motions of the piston. The refrigerator includes a linear vibration motor for making the piston reciprocate. The motor has a stator and a mover, which is supported with a spring so as to form a spring vibration system including the mover. The refrigerator also includes a motor drive control unit for driving and controlling the linear vibration motor. The motor drive control unit is a motor drive control apparatus according to any one of the first to seventh aspects. Therefore, friction loss in the compressor is reduced as compared with a refrigerator using a rotation-type motor as a motor of the compressor, and further, sealability for sealing the refrigerant in the compressor is enhanced, resulting in an increase in operation efficiency of the compressor.

Further, in the refrigerator using the linear vibration motor of the present invention for the motor of the compressor, since friction loss in the compressor is reduced, the amount of waste oil (spent lubricating oil) and the amount of refrigerant to be filled in the compressor can be reduced as in the air conditioner of the eighth aspect, resulting in a contribution to conservation of global environment.

Further, in the refrigerator of the present invention, the frequency of the AC current as the driving current of the linear vibration motor is determined so that the supply power to the linear vibration motor becomes maximum, under the state where the amplitude value of the AC current is maintained at the target amplitude value. Therefore, as in the air conditioner of the eight aspect, drive control for driving the linear vibration motor can be realized with high efficiency regardless of load fluctuations in the compressor, without the necessity of incorporating a sensor, which undesirably leads to increases in size and cost of the compressor, and unnecessary restrictions such as securing operation reliability of the sensor.

According to a tenth aspect of the present invention, a cryogenic freezer is provided that has first and second heat exchangers which form a circulation path for a refrigerant, and a compressor which has a cylinder and a piston, and circulates the refrigerant in the circulation path by reciprocating motions of the piston. The cryogenic freezer includes a linear vibration motor for making the piston reciprocate. The motor has a stator and a mover, which is supported with a spring so as to form a spring vibration system including the mover. The cryogenic freezer also includes a motor drive control unit for driving and controlling the linear vibration motor. The motor drive control unit is a motor drive control apparatus according to any one of the first to seventh aspects. Therefore, friction loss in the compressor is reduced as compared with a cryogenic freezer using a rotation-type motor as a motor of the compressor, and further, sealability for sealing the refrigerant in the compressor is enhanced, resulting in an increase in operation efficiency of the compressor.

Further, in the cryogenic freezer using the linear vibration motor of the present invention for the motor of the compressor, since friction loss in the compressor is reduced, the amount of waste oil (spent lubricating oil) and the amount of refrigerant to be filled in the compressor can be reduced as in the air compressor of the eighth aspect, resulting in a contribution to conservation of the global environment.

Further, in the cryogenic freezer of the present invention, the frequency of the AC current as the driving current of the linear vibration motor is determined so that the supply power to the linear vibration motor becomes maximum, under the state where the amplitude value of the AC current is maintained at the target amplitude value. Therefore, as in the air conditioner of the eight aspect, drive control for driving the linear vibration motor can be realized with high efficiency regardless of load fluctuations in the compressor, without the necessity of incorporating a sensor, which undesirably leads to increases in size and cost of the compressor, and unnecessary restrictions such as securing operation reliability of a sensor.

According to an eleventh aspect of the present invention, a hot-water supply unit is provided that has first and second heat exchangers which form a circulation path for a refrigerant, and a compressor which has a cylinder and a piston, and circulates the refrigerant in the circulation path by reciprocating motions of the piston. The hot-water supply unit includes a linear vibration motor for making the piston reciprocate. The motor has a stator and a mover, which is supported with a spring so as to form a spring vibration system including the mover. The hot-water supply unit also includes a motor drive control unit for driving and controlling the linear vibration motor. The motor drive control unit is a motor drive control apparatus according to any one of the first to seventh aspects. Therefore, friction loss in the compressor is reduced as compared with a hot-water supply unit using a rotation-type motor as a motor of the compressor, and further, sealability for sealing the refrigerant in the compressor is enhanced, resulting in an increase in operation efficiency of the compressor.

Further, in the hot-water supply unit using the linear vibration motor of the present invention for the motor of the compressor, since friction loss in the compressor is reduced, the amount of waste oil (spent lubricating oil) and the amount of refrigerant to be filled in the compressor can be reduced as in the air compressor of the eighth aspect, resulting in a contribution to conservation of the global environment.

Further, in the hot-water supply unit of the present invention, the frequency of the AC current as the driving current of the linear vibration motor is determined so that the supply power to the linear vibration motor becomes maximum, under the state where the amplitude value of the AC current is maintained at the target amplitude value. Therefore, as in the air conditioner of the eight aspect, drive control for driving the linear vibration motor can be realized with high efficiency regardless of load fluctuations in the compressor, without the necessity of incorporating a sensor, which undesirably leads to increases in size and cost of the compressor, and unnecessary restrictions such as securing operation reliability of the sensor.

According to a twelfth aspect of the present invention, a handy phone is provided that has a linear vibration motor for generating vibrations, and a motor drive control unit for driving and controlling the linear vibration motor. The linear vibration motor has a stator and a mover, which is supported by a spring so as to form a spring vibration system including the mover. The motor drive control unit is the motor drive control apparatus according to any one of the first to seventh aspects. Therefore, the process of detecting the resonance frequency of the linear vibration motor included in the handy phone can be carried out without using a position sensor for detecting the position of the mover or the like, whereby drive control for driving the linear vibration motor can be realized with high efficiency regardless of load fluctuations in the compressor, without the necessity of incorporating a sensor, which undesirably leads to increases in size and cost of the compressor, and unnecessary restrictions such as securing operation reliability of the sensor.

DETAILED DESCRIPTION OF THE EMBODIMENTS OF THE PRESENT INVENTION

The inventors of the present invention have discovered that a linear vibration motor can be driven with high efficiency by creating a comparative current waveform (first AC current waveform) to be a reference of an AC current as a driving current from the driving state of the linear vibration motor, adjusting the frequency of the AC current on the basis of the comparative current waveform.

More specifically, the fundamental principle of the present invention is as follows. An amplitude value of the comparative current waveform (first AC current waveform) is determined from the driving state of the linear vibration motor, and the frequency of the AC current as the driving current is adjusted on the basis of the amplitude value of the comparative current waveform, and the linear vibration motor is driven by the AC current having the adjusted frequency. The theoretical grounds for this principle will be specifically described later with respect to first and second embodiments of the invention.

Furthermore, the inventors of the present invention have discovered that a linear vibration motor can be driven with high efficiency by adjusting the frequency of an AC current as a driving current to be supplied to the linear vibration motor so that a power to be supplied to the linear vibration motor becomes maximum, under the state where the amplitude of the AC current is constant.

More specifically, the fundamental principle of the present invention is as follows. The frequency of the driving current is adjusted so that the supply power to the linear vibration motor becomes maximum while keeping the amplitude of the AC current to be supplied to the linear vibration motor constant, and the linear vibration motor is driven with the AC current having the adjusted frequency. The theoretical grounds for this principle will be specifically described later with respect to a third embodiment of the invention.

Hereinafter, the embodiments of the present invention will be described.

First Embodiment

Figure 1:
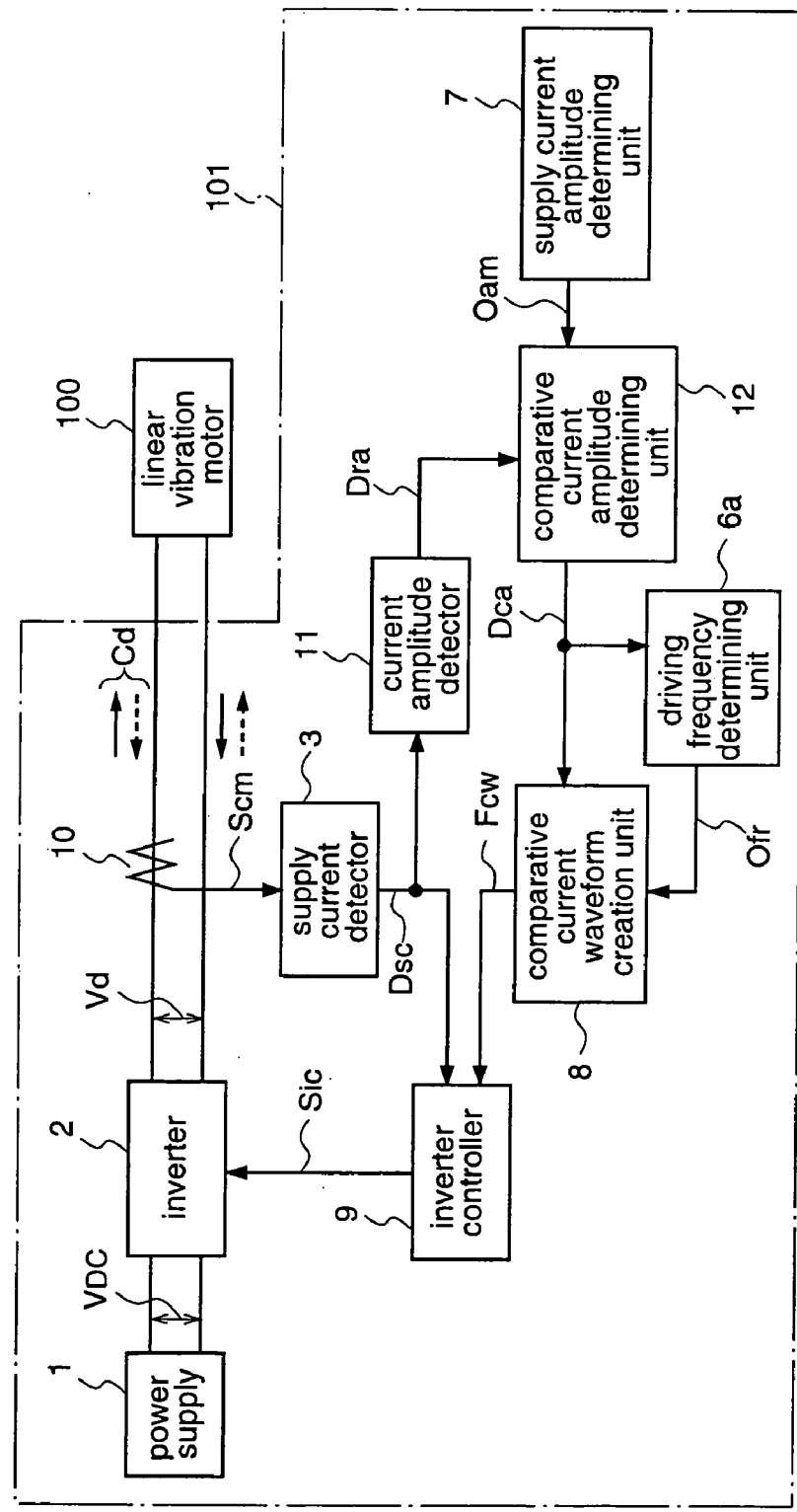
FIG. 1 is a block diagram for explaining a motor drive control apparatus according to a first embodiment of the present invention.

FIG. 1 is a block diagram for explaining a motor drive control apparatus according to the first embodiment of the present invention.

A motor drive control apparatus 101 according to the first embodiment performs feedback drive control for a linear vibration motor 100 which has a stator and a mover, and supports the mover with a spring so as to form a spring vibration system including the mover, on the basis of a comparative current waveform (first AC current waveform) as a reference of a driving current of the linear vibration motor 100. One of the stator and the mover comprises an electromagnet while the other comprises an electromagnet or a permanent magnet.

More specifically, the motor drive control apparatus 101 includes: a power source 1 for generating a DC voltage VDC as a power supply voltage; an inverter 2 for converting the power supply voltage VDC into an AC voltage Vd of a predetermined frequency, and supplying the converted AC voltage Vd to the linear vibration motor 100; a current sensor 10 for monitoring the driving current of the linear vibration motor 100; a supply current detector 3 for detecting an AC driving current (inverter supply current) Cd to be supplied to the linear vibration motor 100 on the basis of a monitor output (current monitor signal) Scm from the current sensor 10, and outputting a supply current detection signal Dsc indicating an instantaneous value (second AC current waveform) I(t) of the driving current Cd; and a current amplitude detector 11 for detecting an amplitude value (actual amplitude value) i of the inverter supply current Cd on the basis of the supply current detection signal Dsc, and outputting a detected amplitude value signal Dra indicating the actual amplitude value i.

The motor drive control apparatus 101 further includes: a supply current amplitude determining unit 7 for determining an output power required of the linear vibration motor 100 from the load conditions of the linear vibration motor 100, and outputting an amplitude command signal Oam indicating a target amplitude value i" of the inverter supply current Cd; and a comparative current amplitude determining unit 12 for determining an amplitude value (comparative amplitude value) i' to be used for control of the linear vibration motor 100 on the basis of the detected amplitude signal Dra from the current amplitude detector 11 and the amplitude command signal Oam from the supply current amplitude determining unit 7, and outputting a comparative amplitude signal Dca indicating the comparative amplitude value i'.

Furthermore, the motor drive control apparatus 101 includes a driving frequency determining unit 6a for determining a frequency (driving frequency) ω of the current (inverter supply current) Cd to be supplied from the inverter 2 to the linear vibration motor 100, on the basis of the comparison amplitude signal Dca from the comparative current amplitude determining unit 12, and outputting a frequency command signal Ofr indicating the driving frequency ω; and a comparative current waveform formation unit 8 for forming a comparative current waveform (comparative current instantaneous value) I'(t) having an amplitude value equal to the comparative amplitude value i' and a frequency equal to the driving frequency ω, on the basis of the frequency command signal Ofra and the comparative amplitude signal Dca, and outputting a comparative current waveform signal Fcw indicating the comparative current waveform.

The motor drive control apparatus 101 further includes an inverter controller 9 for determining an output voltage Vd of the inverter 2 from a difference between the instantaneous value (second AC current waveform) I(t) of the detected inverter supply current and the instantaneous value (first AC current waveform) I'(t) of the comparative current, on the basis of the supply current detection signal Dsc from the supply current detector 3 and the comparative current waveform signal Fcw from the comparative current waveform formation unit 8, and controlling the inverter 2 to generate the determined output voltage Vd according to a control signal Sic.

Figure 2:
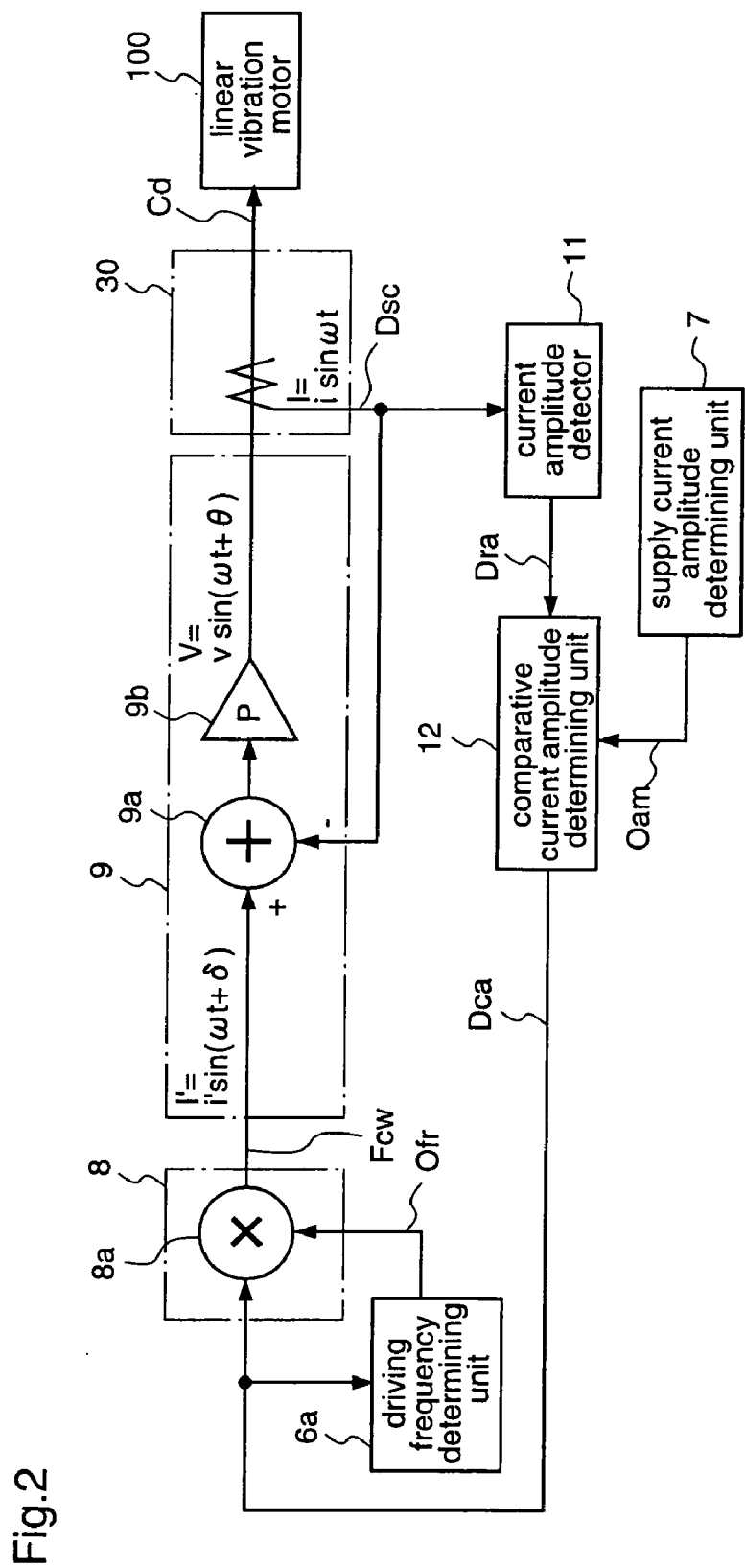
FIG. 2 is a block diagram illustrating constituents of a feedback drive control system in the motor drive control apparatus according to the first embodiment.

In the motor drive control apparatus 101, as shown in FIG. 2, a feedback drive control system for the linear vibration motor 100 is constituted by: a current detection unit 30 comprising the supply current detector 3 and the current sensor 10; the current amplitude detector 11; the comparative current amplitude determining unit 12; the driving frequency determining unit 6a; the comparative current waveform formation unit 8; and the inverter controller 9. In this first embodiment, the detectors 3 and 11, the determining units 6a, 7, and 12, the formation unit 8, and the inverter controller 9 in the motor drive control apparatus 101 are implemented by software.

In FIG. 2, reference numeral 8a denotes an arithmetic unit constituting the comparative current waveform formation unit 8, and the arithmetic unit 8a creates a sinusoidal waveform (comparative current waveform) I'(t) (=i'·sin(ωt+δ)) having an amplitude value equal to the amplitude value i' indicated by the comparative amplitude signal Dca, and a frequency equal to the driving frequency ω indicated by the frequency command signal Ofr. Reference numerals 9a and 9b denote arithmetic units constituting the inverter controller 9. The arithmetic unit 9a is a subtracter for performing subtraction between the sinusoidal waveform I'(t) and the supply current waveform I(t) (=i·sin(ωt)) indicated by the supply current detection signal Dsc, thereby to generate a difference waveform ΔI(t). The arithmetic unit 9b performs P control for the difference waveform ΔI(t) to generates a driving voltage waveform V(t)(=v·sin(ωt+θ). Further, δ is a phase difference between the supply current waveform (detected current instantaneous value) I(t) and the comparative current waveform (comparative current instantaneous value) Iθ(t), and θ is a phase difference between the supply current waveform (detected current instantaneous value) I(t) and the driving voltage waveform (detected voltage instantaneous value) V(t).

Subsequently, the respective constituents of the linear vibration motor drive control apparatus 101 will be described in detail.

Initially, the power supply 1 will be described more specifically.

The power supply 1 supplies a DC voltage VDC to the inverter 2, and a typical example thereof is an input power supply using a commercial AC power supply. Such input power supply comprises a rectifier for rectifying the commercial AC voltage (current), such as a diode bridge circuit or a high power factor converter, and a smoothing capacitor for smoothing the output of the rectifier.

Next, the supply current detector 3 and the current sensor 10 will be described.

The supply current detector 3 detects the current (inverter supply current) Cd to be supplied from the inverter 2 to the linear vibration motor 100, on the basis of the current monitor signal Scm outputted from the current sensor 10. The supply current detector 3 outputs, in real time, the supply current detection signal Dsc in proportion to the supply current Cd to the linear vibration motor 100. The supply current detection signal Dsc to be input to the inverter controller 9 may be either an analog signal or a digital signal.

As for the current sensor 10, a magnetic type current detection sensor using a magnetic substance and a Hall element, or a current transformer for generating a voltage according to the driving current (inverter supply current) of the linear vibration motor 100 may be employed. Further, while in the above description the driving current (inverter supply current) Cd of the linear vibration motor 100 is detected by using the current sensor 10, the driving current (the inverter supply current) Cd may be calculated from a voltage that occurs in a shunt resistor arranged in the current supply path from the inverter 2 to the linear vibration motor 100.

Next, the current amplitude detector 11 will be described.

The current amplitude detector 11 obtains an amplitude value i of the inverter supply current Cd on the basis of the supply current detection signal Dsc outputted from the supply current detector 3.

Generally, since the driving current Cd inputted to the linear vibration motor 100 is a sinusoidal AC current, its amplitude value can be obtained from its peak value. As a method for obtaining the amplitude value, for example, the supply current detection signal Dsc that changes with the passage of time is continuously monitored to maintain its maximum or minimum value.

As another method for obtaining the amplitude value i of the inverter supply current Cd from its peak value, the amplitude value i may be obtained from the value of the supply current detection signal Dsc when the phase of the input current (inverter supply current) Cd is 90° or 270°. There are various kinds of methods for detecting the phase timing when the phase of the inverter supply current Cd becomes 90° or 270° (90° or 270° phase timing). For example, the 90° or 270° phase timing can be obtained from the driving frequency ω of the inverter 2, i.e., the driving cycle T (=2π/ω), with reference to the zero-cross timing of the supply current Cd (i.e., the phase timing when the phase of the supply current Cd is 0° or 180°). Further, the 90° or 270° phase timing may be obtained from the phase of the comparative current waveform signal Fcw inputted to the inverter controller 9, with reference to the zero-cross timing of the supply current Cd.

Since there is a phase difference δ between the comparative current and the actually flowing inverter supply current Cd, the timing when the phase of the supply current Cd becomes 90° or 270° can be obtained with accuracy from the phase of the comparative current, by obtaining the phase difference between them utilizing the respective zero-cross timings.

Furthermore, when the current Cd to be supplied to the linear vibration motor 100 is an AC current on which a DC current is superposed, the amplitude value of the inverter supply current cannot be obtained from the peak value at the 90° or 270° phase timing of the inverter supply current.

In this case, the supply current detection signal Dsc that varies with time is continuously monitored to measure its maximum value and minimum value, and the amplitude value of the AC component is obtained from the average value. The amplitude value of the inverter supply current on which the DC current is superposed may be obtained from an average of the values of the supply current with the phases of 90° and 270°, in a manner similar to that mentioned above.

The motor drive control apparatus 101 according to the first embodiment may be provided with a detector for detecting an average value or effective value of the supply current, instead of the current amplitude detector 11 for detecting the amplitude value of the supply current.

Next, the supply current amplitude determining unit 7 will be described.

The supply current amplitude determining unit 7 outputs an amplitude value command signal Oam indicating a target amplitude value i" of the current to be supplied to the linear vibration motor 100, to the comparative current amplitude determining unit 12. The target amplitude value i" of the inverter supply current Cd is a predetermined current amplitude value.

The amplitude command signal Oam outputted from the supply current amplitude determining unit 7 is not restricted to a signal indicating a predetermined current amplitude value. The amplitude command signal Oam may be a signal which sequentially indicates several kinds of predetermined current amplitude values with the passage of time or the like, for example, according to the elapsed time from the start of driving the linear vibration motor. In other words, the supply current amplitude determining unit 7 may successively designate several kinds of current amplitude values with the passage of time, and output the amplitude command signals Oam corresponding to the designated current amplitude values.

Furthermore, the supply current amplitude determining unit 7 is not restricted to outputting the amplitude command signal Oam indicating the predetermined current amplitude value. For example, the supply current amplitude determining unit 7 may determine a target amplitude value i" of the inverter supply current Cd from the required operating conditions of the linear vibration motor 100 or the load conditions of the motor 100, and output an amplitude command signal Oam indicating the determined target current amplitude value i". In this case, the linear vibration motor 100 can be operated under the operating conditions suited to the load conditions, and further, drive control according to the required performance of the linear vibration motor can be carried out.

The operating conditions of the linear vibration motor 100 include, for example, the amplitude of the mover of the linear vibration motor, and the amplitude of the mover can be obtained by detection of the mover position by using a position sensor, or an arithmetic operation for calculating the stroke of the mover by using the driving current.

There are various kinds of load conditions of the linear vibration motor 100, depending on the applications thereof.

For example, when the linear vibration motor 100 and the motor drive control apparatus 101 according to the first embodiment are applied to a compressor, the load conditions include the pressure and temperature of fluid to be compressed. Especially when this compressor is incorporated in an air conditioner, the load conditions include the indoor temperature and the outdoor temperature. Further, when the compressor is incorporated in a refrigerator, the load conditions include the temperature inside the refrigerator.

Furthermore, when the linear vibration motor 100 and the motor drive control apparatus 101 are applied to a shaver, the load conditions include the thickness of a beard.

Further, there are various kinds of required operating conditions (performances) of the linear vibration motor, depending on the applications thereof. For example, when the linear vibration motor 100 and the motor drive control apparatus 101 are applied to a handy phone, required performances of the linear vibration motor include a function of rhythmically changing the intensity of vibration which makes the user know of an incoming call.

Next, the comparative current determining unit 12 will be described.

The comparative current determining unit 12 receives the detected amplitude value signal Dra from the current amplitude detector 11 and the amplitude command signal Oam from the supply current amplitude determining unit 7, and determines a comparative current amplitude value i' on the basis of amplitude value i of the inverter supply current indicated by the detected amplitude value signal Dra and the target amplitude value i" indicated by the amplitude command signal Oam, and outputs a comparative amplitude signal Dca indicating the determined comparative current amplitude value i'. In the comparative current determining unit 12, the comparative current amplitude value i' is adjusted so that the amplitude value i of the inverter supply current Cd is kept constant, i.e., at the target amplitude value i".

The process of adjusting the comparative current amplitude value i' is repeated at regular intervals. As a method for determining the comparative current amplitude value i', PI control (proportional integral control) is generally carried out, in which the sum of a value in proportion to a difference between the target current amplitude value i" and the actual amplitude value i ($Pk \cdot (i''-i)$), and a value in proportion to an integrated value of the difference ($\Sigma Ik \cdot (i''-i)$). is used as the comparative current amplitude value i'. In this method, Pk is the P (proportional) gain, and Ik is the I (integral) gain. By using the PI control (proportional integral control), the comparative current amplitude value i' can be determined so that the difference between the target current amplitude value i" and the supply current amplitude value i becomes zero.

When using a means (unit) for determining an average value or effective value of the supply current Cd instead of the current amplitude determining unit 11 that determines the amplitude value i of the supply current Cd, it is necessary to use the average value or effective value of the comparative current instead of the comparative current amplitude value i'.

Next, the driving frequency determining unit 6a will be described.

The driving frequency determining unit 6a determines the frequency $\omega$ of the output current Cd of the inverter 2 (inverter supply current) for driving the linear vibration motor 100 so that the comparative current amplitude value i' determined by the comparative current amplitude determining unit 12 becomes maximum.

The relationship between the frequency $\omega$ of the inverter supply current and the comparative current amplitude value i' is a convex function having one extreme value. Accordingly, a maximum grade method (hill climbing method) is generally employed as a method for obtaining a frequency (maximum amplitude frequency) $\omega$imax at which the comparative current amplitude value i' becomes maximum.

To be specific, the hill climbing method for obtaining the maximum amplitude frequency $\omega$imax is a method for repeatedly performing a frequency adjusting process of adjusting the frequency $\omega$ on the basis of the comparative current amplitude value i' that is obtained when the frequency $\omega$ is changed by a predetermined amount of change ($\pm\Delta\omega$) with reference to the current driving frequency $\omega$, thereby to change the driving frequency so that the comparative current amplitude value i' is increased. That is, by repeating the frequency adjusting process, the driving frequency $\omega$ finally reaches the maximum amplitude frequency $\omega$ imax at which the comparative current amplitude value i' becomes maximum, in other words, the driving frequency $\omega$ reaches the resonance frequency $\omega$reso of the linear vibration motor. The frequency adjusting process is repeated with a cycle that is longer than or equal to the repetition cycle of the current adjusting process for adjusting the comparative current amplitude value i'.

Although the hill climbing method has a disadvantage of local stability, since the relationship between the frequency $\omega$ and the amplitude value i' is a function having only one extreme value, local stability never occurs in controlling the frequency. However, depending on the load conditions of the linear vibration motor 100, there is a possibility that theoretically impossible local stability might occur. To avoid the occurrence of such a theoretically impossible local stability, there is a hill climbing method using a genetic algorithm, as an advanced one of the conventional hill climbing method.

The hill climbing method using a genetic algorithm is as follows. Even in the stable state where the driving frequency $\omega$ has a value close to a frequency at which the comparative current amplitude value i' becomes maximum by the conventional hill climbing method, the frequency $\omega$ is greatly changed by a predetermined amount at a certain timing, and the frequency after this change is again subjected to the hill climbing method. Thereby, even if the feedback control of the driving frequency falls into local stability, the driving frequency can be brought to the true resonance frequency.

Next, the comparative current waveform creation unit 8 will be described.

The comparative current waveform creation unit 8 creates a comparative current waveform I'(t) that is necessary for controlling the inverter 2, on the basis of the output signal (comparative amplitude signal) Dca from the comparative current amplitude determining unit 12 and the output signal (frequency command signal) Ofr from the driving frequency determining unit 6a. The comparative current waveform creation unit 8 creates an AC current waveform I'(t) having an amplitude value equal to the comparative current amplitude value i' determined by the comparative current amplitude determining unit 12, and a frequency equal to the driving frequency $\omega$ determined by the driving frequency determining unit 6a.

When a unit for determining an average value or effective value of the supply current Cd is employed instead of the current amplitude determining unit 11 for determining an amplitude value i of the supply current Cd, it is necessary to use a unit for outputting a command signal indicating an average value or effective value of the comparative current instead of the supply current amplitude determining unit 7 for outputting a command signal Oam indicating an amplitude value i' of the comparative current.

Further, the AC current waveform I'(t) created by the comparative current waveform creation unit 8 is not restricted to a sinusoidal wave, and may include various kinds of harmonics.

Further, when it is necessary to supply a current on which a DC component is superposed to the linear vibration motor 100, the comparative current waveform creation unit 8 should superpose the DC component on the created AC current waveform I'(t).

Next, the inverter controller 9 will be described.

The inverter controller 9 controls the driving voltage Vd which is output from the inverter 2 to the linear vibration motor 100 so that a required voltage power is applied to the linear vibration motor 100.

Hereinafter, the inverter controller 9 will be described more specifically.

The inverter controller 9 multiplies a difference between the comparative current instantaneous value (first AC current waveform) I'(t) ($=i'\cdot\sin(\omega t+\delta)$) created by the comparative current waveform creation unit 8 and the supply current instantaneous value (second AC current waveform) I(t) ($=i\cdot\sin(\omega\cdot t)$) detected by the supply current detection unit 3, by a proportional gain P, to determine an instantaneous value V ($=v\cdot\sin(\omega\cdot t+\theta)$) of the inverter supply voltage Vd to be input to the linear vibration motor 100, thereby controlling the inverter 2 so as to output the determined output voltage Vd. The voltage determining process of determining the inverter supply voltage by the inverter controller 9 is repeatedly carried out with a cycle that is shorter than or equal to the repetition cycle of the current adjusting process for adjusting and determining the comparative current amplitude value i'.

Generally, the inverter 2 is controlled as follows. That is, a duty ratio of a pulse signal for driving the inverter 2 is determined on the basis of the ratio between the DC voltage VDC to be input to the inverter 2 and the supply voltage Vd to be output from the inverter 2, and the inverter 2 is driven with the pulse signal of the determined duty ratio. However, the inverter control method is not restricted to such PWM (Pulse Width Modulation). For example, the inverter control method may be PAM (Pulse Amplitude Modulation) or PDM (Pulse Density Modulation).

Next, the operation of the motor drive control apparatus 101 will be described.

Initially, the operation of the motor drive control apparatus 101 according to the first embodiment will be briefly described.

In the motor drive control apparatus 101 according to the first embodiment, the inverter 2 converts a power supply voltage VDC into a predetermined AC voltage Vd in accordance with a control signal Sic from the inverter controller 9, and the AC voltage Vd is supplied to the linear vibration motor 100 as a driving voltage, thereby to drive the linear vibration motor 100.

An AC current (inverter supply current) Cd as a driving current of the linear vibration motor 100 is monitored by the current sensor 10. In the supply current detector 3, the current (inverter supply current) Cd to be supplied to the linear vibration motor 100 is detected on the basis of a monitor output (current motor signal) Scm from the current sensor 10, and a supply current detection signal Dsc indicating an instantaneous value (second AC current waveform) I(t) of the supply current Cd is output to the current amplitude detector 11 and the inverter controller 9. Then, in the current amplitude detector 11, an amplitude value (actual amplitude value) i of the inverter supply current Cd is detected on the basis of the supply current detection signal Dsc, and a detected amplitude signal Dra indicating the actual amplitude value i is output to the comparative current amplitude determining unit 12.

Further, in the supply current amplitude determining unit 7, a target amplitude value (target current amplitude value) i" of the inverter supply current Cd is determined, and an amplitude command signal Oam indicating the target current amplitude value i" is output to the comparative current amplitude determining unit 12.

In the comparative current amplitude determining unit 12, an amplitude value (comparative amplitude value) i' of the comparative current waveform (first AC current waveform) to be used for control of the linear vibration motor 100 is determined on the basis of the detected amplitude signal Dra from the current amplitude detector 11 and the amplitude command signal Oam from the supply current amplitude determining unit 7, and a comparative amplitude signal Dca indicating the comparative amplitude value i' is output to the comparative current waveform creation unit 8 and the driving frequency determining unit 6a.

In the driving frequency determining unit 6a, when the comparative amplitude signal Dca from the comparative current amplitude determining unit 12 is inputted, the frequency (driving frequency) ω of the inverter supply current Cd is adjusted so that the comparative current amplitude value i' indicated by the comparative amplitude signal Dca becomes maximum, and a frequency command signal Ofr indicating the driving frequency ω determined by the frequency adjustment is output to the comparative current waveform creation unit 8.

Then, in the comparative current waveform creation unit 8, a comparative current waveform that is needed for control of the inverter 2 is created on the basis of the output signal (comparative amplitude signal) Dca from the comparative current amplitude determining unit 12 and the output signal (frequency command signal) Ofr from the driving frequency determining unit 6a, and a comparative current waveform signal Fcw indicating the comparative current waveform is input to the inverter controller 9. The comparative current waveform is an AC current waveform I'(t) having an amplitude value equal to the comparative current amplitude value i' indicated by the comparative amplitude signal Dca, and a frequency equal to the driving frequency ω determined by the driving frequency determining unit 6a.

In the inverter controller 9, a difference between the comparative current waveform I'(t) as an instantaneous value of the comparative current and an instantaneous value I(t) of the supply current Cd detected by the supply current detector 3 is multiplied by a proportional gain P, thereby to create an instantaneous value V(t) of the inverter supply voltage Vd to be input to the linear vibration motor 100.

Then, the inverter 2 is controlled by the control signal Sic from the inverter controller 9, and the inverter output voltage Vd is supplied to the linear vibration motor 100.

Next, a description will be given of the characteristics of the linear vibration motor control method according to the first embodiment with reference to formulae (1) to (4) showing the theoretical support therefor.

In the linear vibration motor drive control method according to the first embodiment, a voltage (inverter supply voltage) Vd to be supplied to the linear vibration motor 100 is determined by multiplying a difference between the waveform of the actual current (inverter supply current) Cd that actually flows as a driving current into the linear vibration motor 100 and the comparative current waveform to be a reference of the actual current, by a proportional gain P.

$$V(t) = P(I'(t) - I(t)) \quad (1)$$

Formula (1) shows the relationships among the instantaneous value V(t) of the inverter supply voltage (applied voltage) Vd, the instantaneous value (actual current waveform) I(t) of the actual current (inverter supply current) Cd, and the instantaneous value (comparative current waveform) I'(t) of the comparative current.

Further, the applied voltage instantaneous value V(t), the comparative current instantaneous value I'(t), and the actual current instantaneous value I(t) are specifically expressed by formulas (2a) to (2c) as follows.

$$\begin{cases} V(t) = v \cdot \sin(\omega t - \theta) & (2a) \\ I'(t) = i' \cdot \sin(\omega t - \delta) & (2b) \\ I(t) = i \cdot \sin \omega t & (2c) \end{cases}$$

wherein v is the amplitude value of the applied voltage Vd, i' is the amplitude value of the comparative current, i is the amplitude value of the actual current Cd, ω is the driving frequency, θ is the phase difference between the actual current Cd and the applied voltage Vd, and δ is the phase difference between the actual current Cd and the comparative current.

Figure 3:
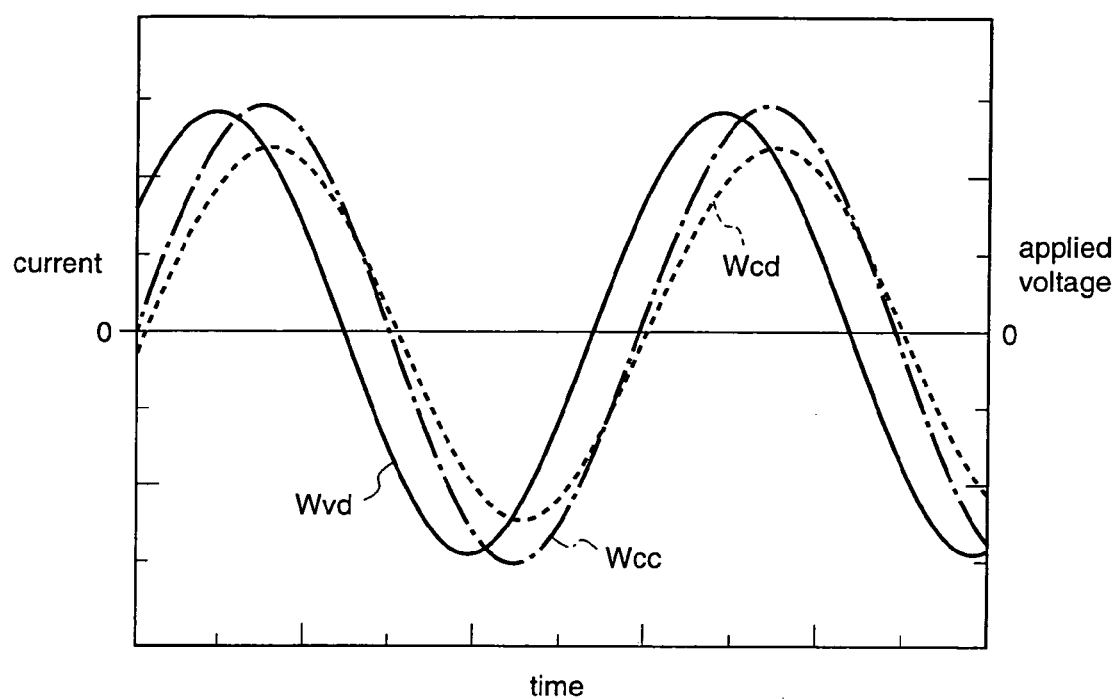
FIG. 3 is a diagram illustrating a comparative current waveform Wcc, an actual current waveform Wcd, and an applied voltage waveform Wvd, which are used for driving and controlling the linear vibration motor according to the first embodiment.

FIG. 3 shows how the comparative current waveform Wcc (comparative current instantaneous value I'(t)), the waveform Wcd of the actual current Cd (the actual current instantaneous value I(t)), and the waveform Wvd of the applied voltage Vd (applied voltage instantaneous value V(t)) change.

When substituting formulae (2a) to (2c) into formula (1), formula (3a) is obtained as follows, and formula (3a) is organized to obtain formula (3b).

$$v \cdot \sin(\omega t - \theta) = P\{i' \cdot \sin(\omega t - \delta) - i \cdot \sin(\omega t)\} \quad (3a)$$

$$\sin \omega t \cdot (v \cdot \cos \theta - P \cdot i' \cos \delta + P \cdot i) + \cos \omega t \cdot (-v \sin \theta + P \cdot i' \cdot \sin \delta) = 0 \quad (3b)$$

In order for formula (3b) to always hold regardless of the variable (ω·t), in formula (3b), the coefficient part of sin ωt in the first term on the left side as well as the coefficient part of cos ωt in the second term on the left side must be zero, respectively. Since the phase difference δ between the comparative current and the actual current Cd is close to zero, sin δ can approximate to δ, and thereby the coefficient part of the cos ωt in the second term is always zero. The reason is that P·i'·δ is equal to v·sin θ in the proportional control shown by formula (1).

Further, formula (4) as follows is derived from the first term on the left side of formula (3b).

$$v \cdot \cos \theta - P \cdot i' \cos \delta + P \cdot i = 0 \quad (4)$$

Since the phase difference δ between the comparative current and the actual current Cd is close to zero, cos δ can approximate to 1, and accordingly, the power Pa (=v·i×cos θ) to be supplied to the linear vibration motor is expressed by formula (5) as follows.

$$v \cdot i \cos \theta = P \cdot i \times (i' - i) \quad (5)$$

In formula (5), the proportional gain P is a constant, and the comparative current amplitude value i' is adjusted so as to make the actual amplitude value i constant in the linear vibration motor drive control method according to the first embodiment, and therefore, the variable that varies with the variations in the frequency θ is only the comparative amplitude value i'.

As can be seen from formula (5), the power Pa (=v·i×cos θ) supplied to the linear vibration motor 100 and the comparative current amplitude value i' are in the relationship of a monotone increase. Accordingly, to maximize the power Pa (=v·i×cos θ) supplied to the linear vibration motor, the frequency ω should be adjusted so that the comparative current amplitude value i' takes its maximum value. As a result, the frequency ωimax at which the comparative current amplitude value i' takes the maximum value can be detected as the resonance frequency ωreso of the linear vibration motor.

Further, as is generally known, in the linear vibration motor, the relationship between the driving frequency ω and the supply power Pa is a convex function having one extreme value, and the frequency ω pmax at which the supply power Pa becomes maximum is the resonance frequency ωreso. That is, when the driving frequency is monotonously increased or decreased, the supply power becomes maximum at only one specific frequency.

Therefore, the relationship between the comparative current amplitude value i' and the driving frequency ω is also a convex function having one extreme value, and the frequency ωimax at which the comparative current amplitude value i' becomes maximum is the frequency ωpmax at which the supply voltage becomes maximum, and this is equal to the resonance frequency ωreso of the linear vibration motor.

As described above, according to the first embodiment, the motor drive control apparatus 101 for driving and controlling the linear vibration motor 100 with an AC current is provided with the supply current detector 3 for detecting the driving current (inverter supply current) Cd of the linear vibration motor 100, the comparative current waveform creation unit 8 for creating a comparative current waveform to be a reference of the driving current of the linear vibration motor 100 on the basis of the operating conditions of the linear vibration motor, and the inverter controller 9 for feedback-controlling the driving voltage of the linear vibration motor so that a difference between the comparative current waveform and the waveform of the detected supply current Cd becomes zero. Further, the motor drive control apparatus 101 is constructed so as to adjust the frequency ω of the supply current Cd so that the amplitude value i' of the comparative current waveform becomes maximum. Therefore, the driving frequency of the linear vibration motor 100 can always be brought to the resonance frequency or a frequency close to the resonance frequency without using a device such as a position sensor.

Further, since the process of adjusting the driving current of the linear vibration motor is carried out on the basis of the driving current of the linear vibration motor, the detected result of the driving current of the linear vibration motor can be used as it is for drive control, and therefore, arithmetic processing for the detected driving current is not necessary.

While the detectors 3 and 11, the determining units 6a and 7, the creation units 8 and 12, and the inverter controller 9 are implemented by software in the motor drive control apparatus 101 according to the first embodiment, these units may be implemented by hardware.

Second Embodiment

Figure 4:
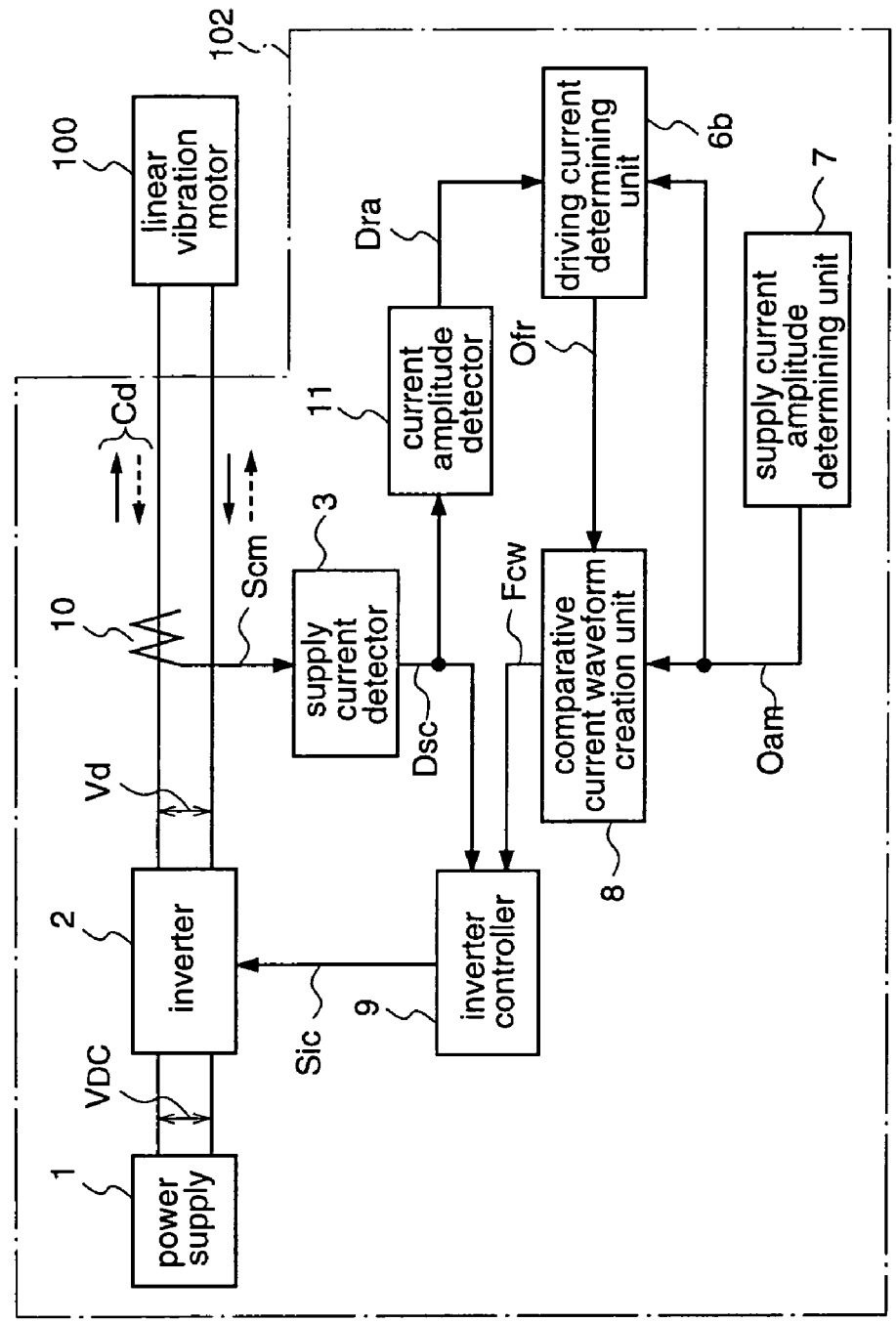
FIG. 4 is a block diagram for explaining a motor drive control apparatus according to a second embodiment of the present invention.

FIG. 4 is a block diagram illustrating a motor drive control apparatus according to a second embodiment of the present invention.

A linear vibration motor drive control apparatus 102 according to the second embodiment is provided with, instead of the comparative current amplitude value determining unit 12 and the driving frequency determining unit 6a of the first embodiment, a driving frequency determining unit 6b for determining a driving frequency ω of the inverter supply voltage Vd on the basis of the target amplitude value i" of the inverter supply current Cd that is determined by the supply current amplitude determining unit 7 and the actual amplitude value i of the inverter supply current Cd that is detected by the current amplitude detector 11.

A power supply 1, an inverter 2, a supply current detector 3, a supply current amplitude determining unit 7, a comparative current waveform creation unit 8, an inverter controller 9, a current sensor 10, and a current amplitude detector 11 according to this second embodiment are identical to those of the first embodiment.

In this second embodiment, however, an amplitude signal to be input to the comparative current waveform creation unit 8 is not a comparative amplitude signal Dca indicating the comparative current amplitude value i' that is created on the basis of the actual amplitude value i and the target amplitude value i" of the inverter supply current, but is an amplitude command signal Oam indicating the target amplitude value i". The comparative current waveform creation unit 8 according to the second embodiment uses the target amplitude value i" indicated by the amplitude command signal Oam as the comparative amplitude value i' of the first embodiment, and creates an AC current waveform I'(t) having an amplitude value equal to the comparative amplitude value i' and a frequency equal to the driving frequency ω determined by the driving frequency determining unit 6b. Therefore, in the driving frequency determining unit 6b, the target amplitude value i" is treated as one which is equal to the comparative amplitude value i' of the first embodiment.

Figure 5:
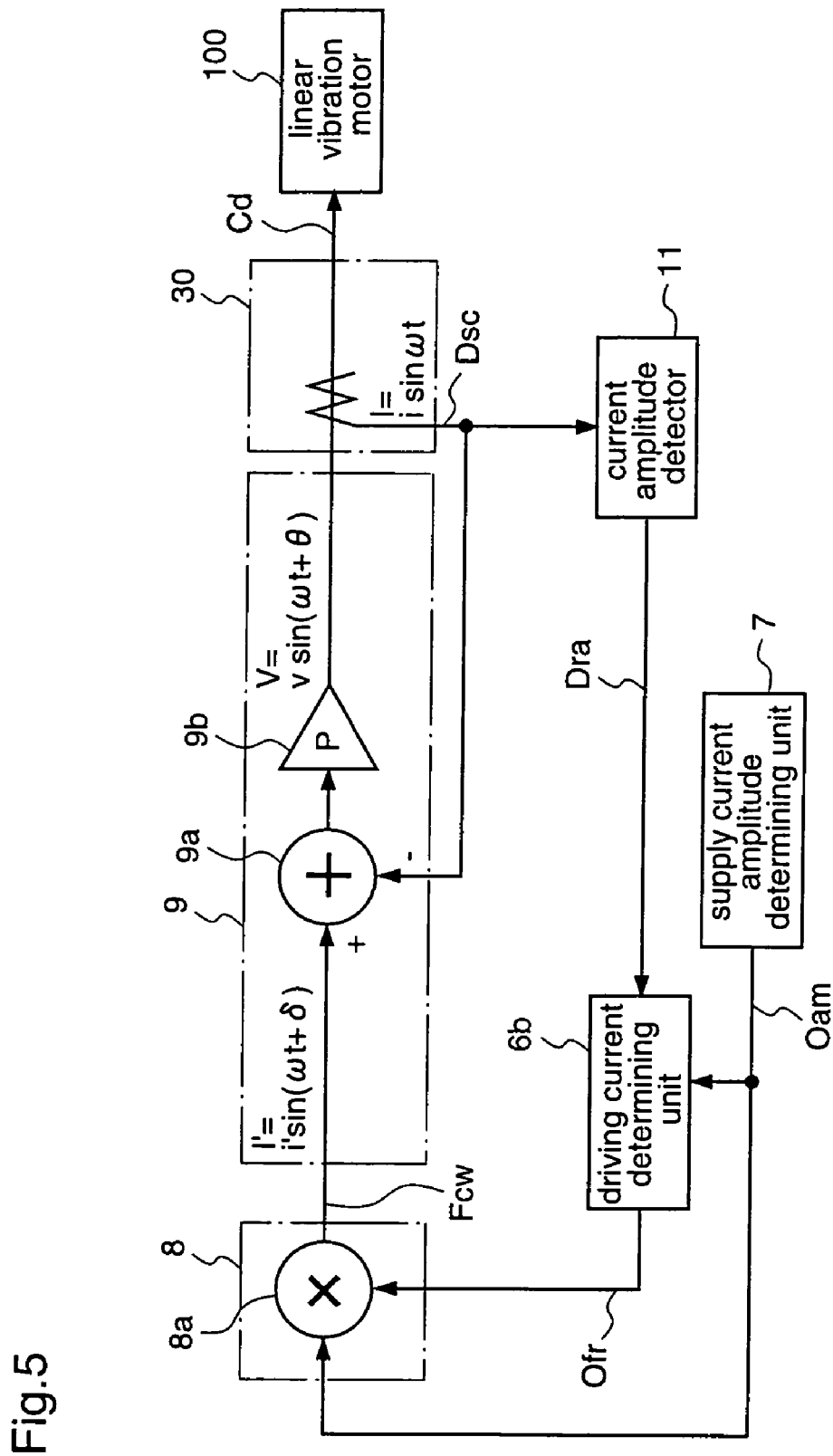
FIG. 5 is a block diagram illustrating constituents of a feedback drive control system in the motor drive control apparatus according to the second embodiment.

In the motor drive control apparatus 102, as shown in FIG. 5, a feedback drive control system of the linear vibration motor 100 is constituted by the current detector 30 comprising the supply current detector 3 and the current sensor 10, the current amplitude detector 11, the driving frequency determining unit 6b, the comparative current waveform creation unit 8, and the inverter controller 9. In FIG. 5, the same reference numerals as those shown in FIG. 2 denote the same elements.

Next, the operation of the motor drive control apparatus 102 will be described.

The motor drive control apparatus 102 of this second embodiment is different from the motor drive control apparatus 101 of the first embodiment only in the operation for determining the frequency (driving frequency) of the inverter supply current Cd on the basis of the command output (amplitude command signal) Oam from the supply current amplitude determining unit 7 and the detection output (amplitude value signal) Dra from the current amplitude detector 11, and therefore, the operation for determining a driving frequency will be described in detail.

The driving frequency determining unit 6b receives the detected amplitude value signal Dra indicating the amplitude value i of the inverter supply current Cd which is detected by the current amplitude detector 11, and the amplitude command signal Oam indicating the target amplitude value i" which is determined by the supply current amplitude determining unit 7b.

Then, in the driving frequency determining unit 6b, frequency adjustment for adjusting the driving frequency ω is carried out so that the supply current amplitude value i becomes half the comparative amplitude value i' as the target amplitude value i", and the driving frequency ω is determined by the frequency adjustment.

However, depending on the operating conditions of the motor drive control apparatus 102, there are cases where the supply current amplitude value i does not become half the comparative amplitude value i' even though the driving frequency ω is changed. In these cases, when the supply current amplitude value i is always larger than half of the comparative current amplitude value i', the driving frequency ω is adjusted so that the supply current amplitude i takes its minimum value. Conversely, when the supply current amplitude value i is always smaller than half of the comparative current amplitude value i', the driving frequency ω is determined so that the supply current amplitude i takes its maximum value.

Figure 6:
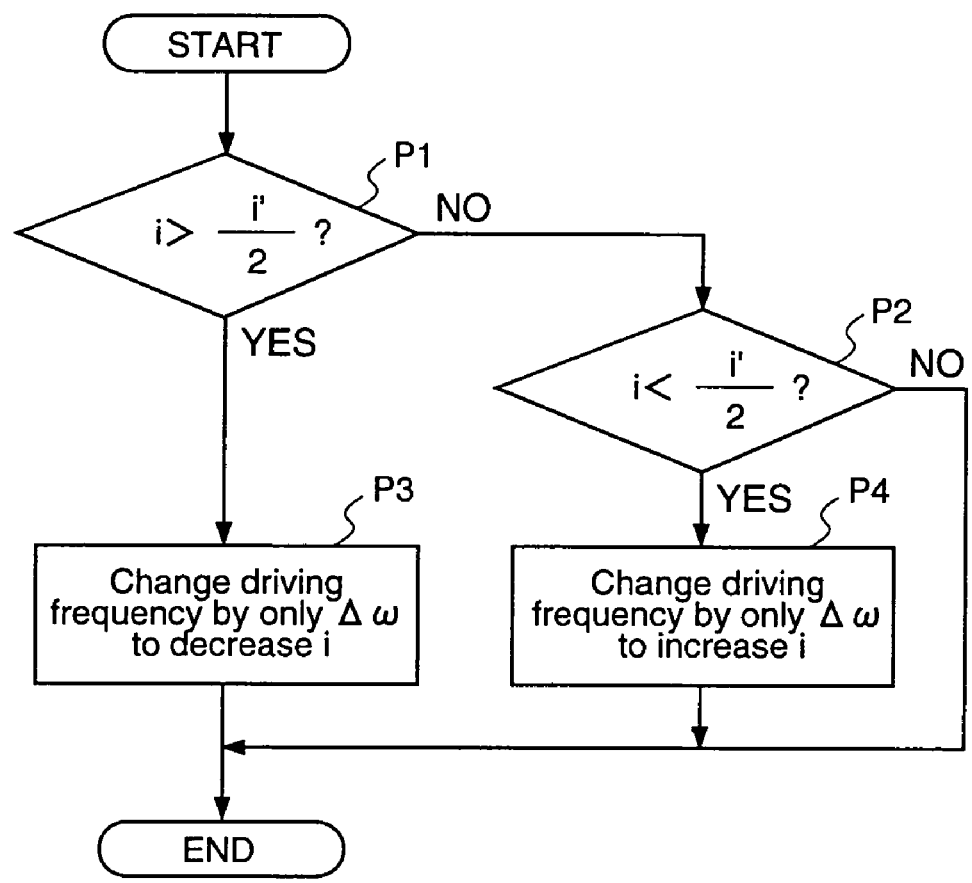
FIG. 6 is a flowchart illustrating process steps to be performed by a driving frequency determining unit in the motor drive control apparatus according to the second embodiment.

FIG. 6 is a diagram specifically illustrating an example of a process flow for determining the driving frequency by the driving frequency determining unit 6b.

Initially, in the driving frequency determining unit 6b, a comparison as to which is larger between the actual amplitude value i and half of the comparative amplitude value i' (i'/2) is carried out on the basis of the supply current amplitude value (actual amplitude value) i and the comparative current amplitude value i' (target amplitude value i") which are inputted information.

To be specific, initially it is judged whether or not the actual amplitude value i is larger than half of the comparative current value i' (step P1). When it is judged that the actual amplitude value i is larger than half of the comparative amplitude value i', adjustment of the driving frequency is carried out (step P3). When the actual amplitude value i is judged not to be larger than half of the comparative amplitude value i', a further judgement is carried out (step P2).

That is, when the actual amplitude value i is not larger than half of the comparative amplitude value i', it is judged whether or not the actual amplitude value i is smaller than half of the comparative amplitude value i' (step P2). When it is judged that the actual amplitude value i is smaller than half of the comparative amplitude value i', an adjustment of the driving frequency is carried out (step P4).

When it is judged in step P2 that the actual amplitude value i is not smaller than half of the comparative amplitude value i', the current driving frequency is maintained, and the driving frequency determining process is completed. That is, when the actual amplitude value i is judged as not being smaller than half of the comparative amplitude value i' in step P2, since it has been judged as not being larger than half of the comparative amplitude value i' in step P1, the actual amplitude value i is neither larger nor smaller than half of the comparative amplitude value i', that is, these values are equal to each other, and the driving frequency is maintained at the current value.

On the other hand, when it is judged in step P1 that the actual amplitude value i is larger than half of the comparative amplitude value i', the driving frequency ω is changed by an amount Δω so that the input current amplitude value (actual amplitude value) i becomes smaller than the current value (step P3), and the target frequency determining process is completed.

Further, when it is judged in step P2 that the actual amplitude value i is smaller than half of the comparative amplitude value i', the driving frequency ω is changed by an amount Δω so that the supply current amplitude value (actual amplitude value) i becomes larger than the current value (step P4), and the driving frequency determining process is completed.

The driving frequency determining process is repeated at a constant cycle, and the cycle is longer than or equal to the cycle of the voltage determining process for determining the inverter supply voltage in the inverter controller 9.

When there is an optimum driving frequency at which the supply current amplitude value i is equal to half of the comparative amplitude value i', the driving frequency ω approaches the optimum driving frequency as the driving frequency determining process is repeated. Under the state where the actual amplitude value i is always larger than half of the comparative amplitude value i', the driving frequency ω approaches an optimum driving frequency at which the actual amplitude value becomes minimum, by repeating the frequency determining process. Furthermore, under the state where the actual amplitude value i is always smaller than half of the comparative amplitude value i', the driving frequency ω approaches an optimum driving frequency at which the actual amplitude value i becomes maximum, by repeating the frequency determining process.

In the flow of the driving frequency determining process shown in FIG. 6, the judgement as to whether or not the actual amplitude value i is smaller than half of the comparative amplitude value i' (step P2) is carried out after the judgement as to whether or not the actual amplitude value i is larger than half of the comparative amplitude value i' (step P1). However, the judgement in step P1 and the judgement in step P2 may be interchanged with the same judgement result as described above.

Next, the characteristics of the linear vibration motor drive control method according to the second embodiment will be described using formula (6) that shows the theoretical support therefor.

Also, in this second embodiment, as in the first embodiment, an inverter supply voltage Vd to be applied to the linear vibration motor is determined by multiplying a difference between the comparative current waveform and the waveform of the actual current (inverter supply current) Cd that actually flows into the linear vibration motor 100, by a proportional gain P, and therefore, the input power to the linear vibration motor 100 is expressed by formula (5).

However, in contrast to the first embodiment, the linear vibration motor 100 is controlled under the condition that the comparative amplitude value i' is constant, i.e., under the condition that the comparative amplitude value i' is the target amplitude value i".

The following formula (6) is obtained by changing formula (5) with the comparative amplitude value i' being a constant.

$$v \cdot i \cos\theta = -P \times \left(i - \frac{i'}{2}\right)^2 + \frac{P \cdot i'^2}{4} \quad (6)$$

Figure 7A:
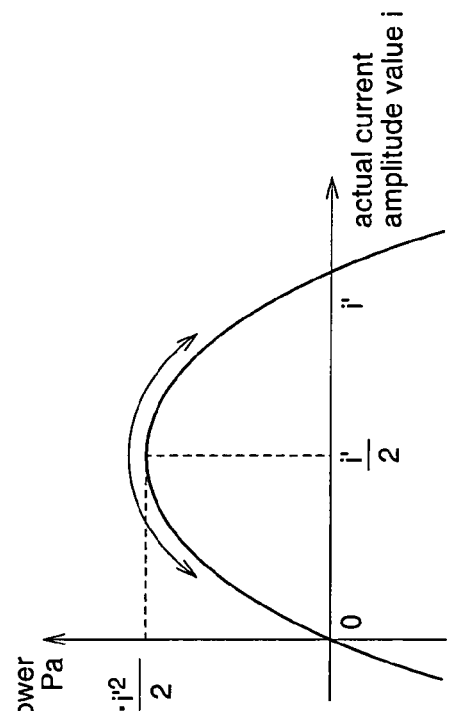
FIGS. 7(a)–7(c) are diagrams illustrating three examples of relationships between an amplitude value i of an actual current supplied to a linear vibration motor of the second embodiment, and a supply power Pa.
Figure 7B:
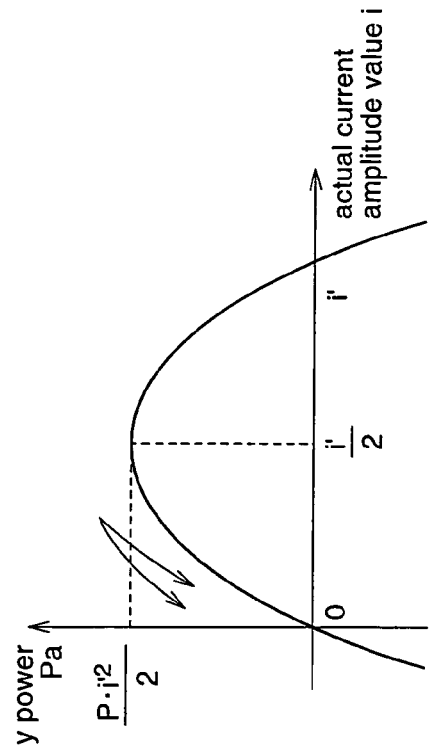
Figure 7C:
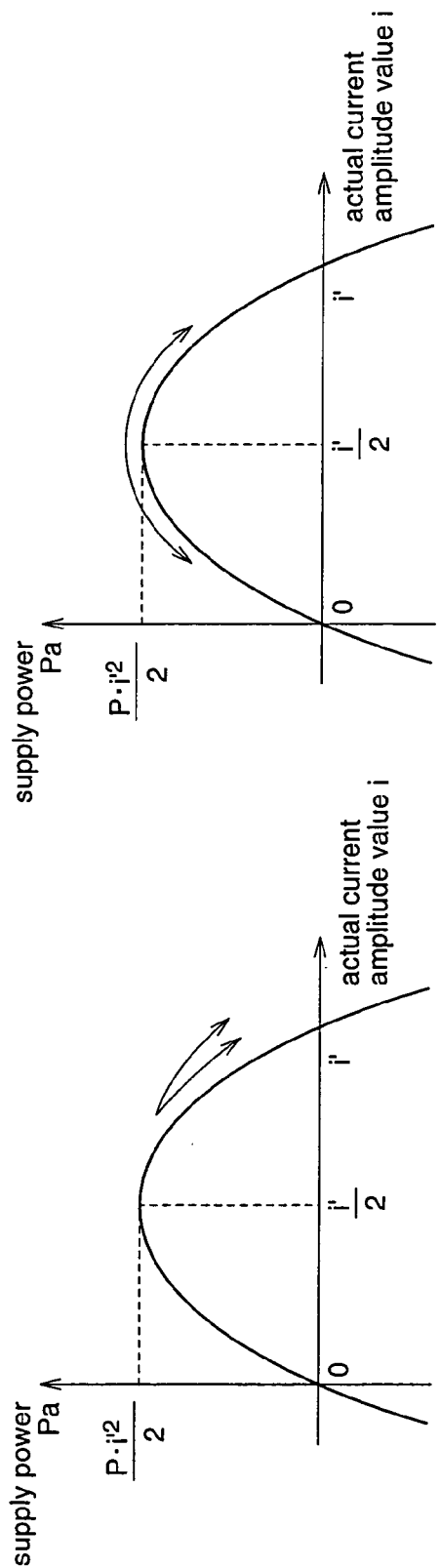

FIGS. 7(a)–7(c) are graphs illustrating the relationships shown by formula (6).

Three patterns shown in FIGS. 7(a)–7(c) are proposed as patterns of changes of the actual current amplitude value i when the driving frequency ω is changed.

More specifically, FIG. 7(a) shows a pattern in which the actual current amplitude value (the amplitude value of the supply current Cd) i never falls below the command current amplitude value (the amplitude value of the comparative current Cc) i' even when the driving frequency ω is changed. In this pattern, the driving frequency at which the actual current amplitude value becomes minimum is the resonance frequency.

FIG. 7(b) shows a pattern in which the actual current amplitude value i changes across a value that is half of the comparative amplitude value i' when the driving frequency ω is changed. In this pattern, the driving frequency at which the actual current amplitude value i becomes equal to half of the comparative amplitude value i' is the resonance frequency.

FIG. 7(c) shows a pattern in which the actual current amplitude value i never exceeds half of the comparative amplitude value i' even when the driving frequency ω is changed. In this pattern, the driving frequency at which the actual current amplitude value i becomes maximum is the resonance frequency.

Accordingly, in order to maximize the power Pa (=v·ixcos θ) to be applied from the inverter 2 to the linear vibration motor 100, the actual current amplitude value i should be half the comparative current amplitude value i'. However, since the actual current amplitude value i appears as a result of operation of the linear vibration motor 100, the range of its possible values is restricted. Therefore, it is not always possible to bring the actual current amplitude value i to half of the comparative current amplitude value i'.

As can be seen from FIG. 7, when the actual current amplitude value i is always larger than half of the comparative amplitude value i', the frequency at which the actual amplitude value i becomes minimum is the frequency at which the power becomes maximum, that is, the resonance frequency. Conversely, when the actual current amplitude value i is always smaller than half of the comparative amplitude value i', the frequency at which the actual amplitude value i becomes maximum is the resonance frequency.

As is generally known, in the linear vibration motor, the relationship between the driving frequency and the supply current is a convex function having one extreme value, and the frequency at which the supply voltage takes its maximum is the resonance frequency. That is, when the driving frequency is monotonously increased or decreased, there is only one frequency at which the power becomes maximum.

As described above, according to the second embodiment, the motor drive control apparatus 102 for drive-controlling the linear vibration motor 100 with the AC current Cd is provided with: the supply current detector 3 for detecting the driving current (inverter supply current) Cd of the linear vibration motor 100; the comparative current waveform creation unit 8 for creating a comparative current waveform having a constant amplitude value, which is a reference of the driving current of the linear vibration motor 100, on the basis of the operation conditions of the linear vibration motor; and the inverter controller 9 for feedback-controlling the driving voltage of the linear vibration motor 100 so that a difference between the comparative current waveform and the waveform of the detected supply current Cd becomes zero. Further, the frequency of the driving current is adjusted so that the amplitude value i of the detected driving current approaches half of the comparative current amplitude value i'. Therefore, the driving frequency of the linear vibration motor can always be brought to the resonance frequency or a frequency close to the resonance frequency without using a device such as a position sensor, and moreover, control of the driving frequency of the linear vibration motor can be carried out with stability.

Third Embodiment

FIG. 7 is a block diagram for explaining a motor drive control apparatus according to a third embodiment of the present invention.

A motor drive control apparatus 103 according to the third embodiment performs feedback drive control of a linear vibration motor 100 having a stator and a mover, which is supported with a spring so as to form a spring vibration system including the mover, on the basis of a driving voltage and a driving current of the linear vibration motor 100, similar to the motor drive control apparatus 101 according to the first embodiment. This third embodiment is different from the first embodiment in that the frequency of an AC current as the driving current is determined on the basis of a power applied to the linear vibration motor 100, whereas the frequency of an AC current as the driving current is determined on the basis of the driving current of the linear vibration motor in the first embodiment. One of the stator and the mover comprises an electromagnet while the other comprises an electromagnet or a permanent magnet.

The motor drive control apparatus 103 includes: a power source 1 for generating a power supply voltage (DC voltage) VDC; an inverter 2 for converting the power supply voltage VDC into an AC voltage Vd of a predetermined frequency, and supplying the converted AC voltage Vd to the linear vibration motor 100; and a current sensor 10 for monitoring the driving current of the linear vibration motor 100.

The motor drive control apparatus 103 further includes a supply current detector 3 for detecting an AC driving current (inverter supply current) Cd to be supplied from the inverter 2 to the linear vibration motor 100 on the basis of a current monitor output Scm from the current sensor 10, and outputting a supply current detection signal Dsc indicating an instantaneous value (detected current instantaneous value) I(t) of the driving current; and a supply voltage detector 4 for detecting a driving voltage of the linear vibration motor 100 which is an output voltage (inverter supply voltage) Vd from the inverter 2, and outputting a supply voltage detection signal Dsv indicating an instantaneous value (detected voltage instantaneous value) V(t) of the driving voltage.

The motor drive control apparatus 103 further includes a supply voltage calculator 5 for calculating a supply power Pa to be supplied from the inverter 2 to the linear vibration motor 100 on the basis of the instantaneous value (detected current instantaneous value) I(t) of the inverter supply current Cd detected by the supply current detector 3, and the instantaneous value (detected voltage instantaneous value) V(t) of the inverter supply voltage Vd detected by the supply voltage detector 4, and for outputting a supply voltage calculation signal Osp indicating the supply power Pa.

The motor drive control apparatus 103 further includes a driving frequency determining unit 6c for determining a frequency (driving frequency) ω of the current (inverter supply current) Cd to be supplied from the inverter 2 to the linear vibration motor 100, on the basis of the supply voltage calculation signal Osp from the supply voltage calculator 5, and outputting a frequency command signal Ofr indicating the driving frequency a); and a supply current amplitude determining unit 7 for outputting an amplitude command signal Oam indicating a target amplitude value (target current amplitude value) i'' of the inverter supply current Cd.

The motor drive control apparatus 103 further includes a comparative current waveform creation unit 8 for creating a comparative current waveform to be a reference of the inverter supply current Cd, which waveform has an amplitude value (comparative amplitude value) i' equal to the target current amplitude value i" indicated by the amplitude command signal Oam, and a frequency equal to the driving frequency ω indicated by the driving frequency signal Of, and for outputting a comparative current waveform signal Fcw indicating the comparative current waveform (comparative current instantaneous value) I'.

The motor drive control apparatus 103 further includes an inverter controller 9 for determining an output voltage (inverter supply voltage) Vd of the inverter 2 so that a difference between the instantaneous value (detected current instantaneous value) I(t) of the inverter supply current Cd and the comparative current instantaneous value I'(t) is decreased, on the basis of the output signal (supply current detection signal) Dsc from the supply current detector 3 and the output signal (comparative current waveform signal) Fcw from the comparative current waveform creation unit 8, and controlling the inverter 2 with a control signal Sic so as to generate the determined output voltage Vd.

In the motor drive control apparatus 103, a feedback drive control system for the linear vibration motor 100 is constituted by the supply current detector 3, the supply voltage detector 4, the supply power calculator 5, the driving frequency determining unit 6c, the comparative current waveform creation unit 8, and the inverter controller 9. In this third embodiment, the detectors 3 and 4, the calculator 5, the determining units 6c and 7, the creation unit 8, and the inverter controller 9 are implemented by software.

Subsequently, the respective constituents of the linear vibration motor drive control apparatus 103 will be described in detail.

The power supply 1 is identical to the power supply 1 in the motor drive control apparatus 101 according to the first embodiment.

Next, the supply current detector 3, the current sensor 10, and the supply voltage detector 4 will be described in detail.

The supply current detector 3 detects the output current (inverter supply current) Cd from the inverter 2 that is a driving current of the linear vibration motor 100, on the basis of the current monitor signal Scm outputted from the current sensor 10, and outputs a supply current detection signal Dsc indicating an instantaneous value (detected current instantaneous value) I(t) of the current Cd to the supply voltage calculator 5 and the inverter controller 9. The current sensor 10 is identical to that of the motor drive control apparatus 101 according to the first embodiment.

The supply voltage detector 4 detects the driving voltage (inverter supply voltage) Vd to be supplied from the inverter 2 to the linear vibration motor 100, and outputs a supply voltage detection signal Dsv indicating an instantaneous value (detected voltage instantaneous value) V(t) of the driving voltage Vd to the supply voltage calculator 5. As a method for detecting the inverter supply voltage Vd, a measurement method in which a line voltage is divided is generally employed. However, when the inverter 2 is a voltage-controlled PWM (Pulse With Modulation) inverter, since the waveform of the supply voltage Vd is a PWM waveform, it is difficult to directly measure the voltage. So, as a method for measuring the supply voltage of the voltage-controlled PWM inverter, the PWM waveform of the inverter supply voltage Vd is shaped by using, for example, a low-pass filter comprising a transformer or a capacitor and a resistor, and the waveform-shaped supply voltage is measured. However, the method for obtaining the inverter supply voltage Vd is not restricted to the above-mentioned one using a low-pass filter, and the inverter supply voltage Vd may be calculated from the DC voltage VDC inputted to the inverter 2 and the pulse width of the PWM voltage outputted from the inverter 2.

Next, the supply power calculator 5 will be specifically described.

The supply power calculator 5 calculates an average supply power Pa to the linear vibration motor 100 from the voltage Vd and current Cd supplied to the linear vibration motor 100. More specifically, the supply power calculator 5 calculates a supply power instantaneous value P(t) from the product between the detected current instantaneous value I(t) indicated by the supply current detection signal Dsc outputted from the supply current detector 3 and the detected voltage instantaneous value V(t) indicated by the supply voltage detection signal Dsv outputted from the supply voltage detector 4, and sums up the calculated supply power instantaneous values P(t) during a period corresponding to one cycle of the driving frequency or a period corresponding to an integral multiple of the cycle, and thereafter, divides the summed instantaneous value by a time indicating the period, thereby calculating an average supply power Pa to the linear vibration motor 100. The supply power Pa may be calculated by averaging the supply power instantaneous values P(t) by using a low-pass filter.

Next, the supply current amplitude determining unit 7 will be specifically described.

The supply current amplitude determining unit 7 is identical to that of the first embodiment, i.e., the supply current amplitude determining unit 7 outputs an amplitude command signal Oam indicating the target amplitude value (target current amplitude value) i" of the current (inverter supply current) Cd applied to the linear vibration motor 100. In this third embodiment, the target amplitude value i" of the inverter supply current Cd is a predetermined current amplitude value.

However, the amplitude command signal Oam is not restricted to a signal indicating one current amplitude value, and may be a signal successively indicating several kinds of predetermined current amplitude values with the passage of time.

Further, the supply current amplitude determining unit 7 is not restricted to one outputting an amplitude command signal Oam indicating a predetermined current amplitude value, and may determine a target amplitude value i" of the inverter supply current Cd from required operating conditions of the linear vibration motor 100 or load conditions thereof, and output an amplitude command signal Oam indicating the determined target current amplitude value. In this case, the linear vibration motor 100 can be driven and controlled under the operating conditions that are suited to the load conditions as in the first embodiment, and moreover, the linear vibration motor 100 can be driven and controlled under the required operating conditions.

The operating conditions of the linear vibration motor 100 include, for example, the amplitude of the mover of the linear vibration motor 100, and the amplitude of the mover can be obtained by detection of mover position by using a position sensor, or arithmetic processing for obtaining the stroke of the mover by using the driving current.

Further, there are various kinds of load conditions of the linear vibration motor 100 according to the applications thereof. For example, when the linear vibration motor 100 and the motor drive control apparatus 103 according to the third embodiment are applied to a compressor, the load conditions include the pressure and temperature of fluid to be compressed. Especially when this compressor is incorporated in an air conditioner, the load conditions include the indoor temperature and the outdoor temperature. Further, when the compressor is incorporated in a refrigerator, the load conditions include the temperature inside the refrigerator.

Furthermore, when the linear vibration motor 100 and the motor drive control apparatus 103 are applied to a shaver, the load conditions include the thickness of a beard.

On the other hand, there are various kinds of required operating conditions (performances) of the linear vibration motor according to the applications thereof. For example, when the linear vibration motor 100 and the motor drive control apparatus 103 are applied to a handy phone, required performances of the linear vibration motor 100 include a function of rhythmically changing the intensity of vibration which let the user know of an incoming call.

Next, the driving frequency determining unit 6c will be described specifically.

The driving frequency determining unit 6c determines a frequency (driving frequency) ω of the current Cd to be supplied to the linear vibration motor 100 on the basis of the supply power Pa to the linear vibration motor 100 which is calculated by the supply power calculator 5, and the drive frequency determining unit 6c repeatedly carries out frequency adjustment for adjusting the frequency ω of the inverter supply current Cd so that it approaches the resonance frequency ωreso of the linear vibration motor 100.

More specifically, the driving frequency determining unit 6c adjusts the driving frequency ω so that the supply power Pa to the linear vibration motor 100 which is calculated by the supply power calculator 5 becomes maximum, under the state where the amplitude value i' of the comparative current waveform is kept constant so that it matches the target current amplitude value i" determined by the supply current amplitude determining unit 7.

Next, the comparative current waveform creation unit 8 will be described specifically.

The comparative current waveform creation unit 8 creates a comparative current waveform (first AC current waveform) having an amplitude value (comparative amplitude value) i' equal to the target current amplitude value i" determined by the supply current amplitude determining unit 7, and a frequency equal to the driving frequency ω determined by the driving frequency determining unit 6, and outputs a comparative current waveform signal Fcw indicating the comparative current waveform (comparative current instantaneous value) I'(t) to the inverter controller 9. The phase of the comparative current is set according to the phase of the inverter supply current Cd.

Finally, the inverter controller 9 will be described specifically.

The inverter controller 9 adjusts the inverter supply voltage Vd so as to decrease a difference between the instantaneous value I(t) of the inverter supply current Cd indicated by the detection output Dsc of the supply current detector 3 and the instantaneous value I'(t) of the comparative current created by the comparative current waveform creation unit 8, and determines a value at which the difference becomes minimum. For example, the inverter supply voltage Vd is adjusted by adjusting the PWM width of the output pulse voltage of the inverter 2 by a control signal Sic.

As a specific method for determining the inverter output voltage, there is a method according to P (proportional) control or PI (proportional and integral) control having an appropriate gain. For example, in the method according to P control, a waveform difference ΔI (=I'(t)−I(t)) between the detected current waveform indicating the detected current instantaneous value I(t) and the comparative current waveform indicating the comparative current instantaneous value I'(t) is multiplied by an appropriate gain P, and the obtained product is regarded as the inverter output voltage Vd. On the other hand, in the method according to PI control, the product between the waveform difference ΔI (=I'(t)−I(t)) and the appropriate gain P is added to an integral value of the waveform difference ΔI (=I'(t)−I(t)), and the obtained sum is regarded as the inverter output voltage Vd.

Next, the operation of the motor drive control apparatus 103 will be described.

FIG. 9(*a*) is a flowchart illustrating the operation of the motor drive control apparatus 103 for driving and controlling the linear vibration motor 100.

In this third embodiment, the motor drive control apparatus 103 drives the linear vibration motor 100 by controlling the frequency of the inverter supply current Cd so that the supply power Pa to the linear vibration motor 100 becomes maximum, under the state where the amplitude value i of the current (inverter supply current) Cd supplied from the inverter 2 to the linear vibration motor 100 is maintained at the predetermined comparative amplitude value i' (=target amplitude value i").

First of all, the entire operation of the motor drive control apparatus 103 will be described.

In the motor drive control apparatus 101 according to the third embodiment, the inverter 2 converts the power supply voltage VDC into a predetermined AC current in accordance with a control signal Sic from the inverter controller 9, and the AC current is supplied to the linear vibration motor 100 as a driving current, thereby to drive the linear vibration motor 100.

The inverter supply current Cd as a driving current of the linear vibration motor 100 is monitored by the current sensor 10. In the supply current detector 3, the current (inverter supply current) Cd to be supplied to the linear vibration motor 100 is detected on the basis of the current monitor signal Scm outputted from the current sensor 10, and a supply current detection signal Dsc indicating the instantaneous value I(t) of the supply current Cd is output to the supply voltage calculator 5 and the inverter controller 9. In the supply voltage detector 4, the driving voltage Vd of the linear vibration motor 100 is detected, and a supply voltage detection signal Dsv indicating the instantaneous value V(t) of the driving voltage Vd is supplied to the supply power calculator 5.

In the motor drive control apparatus 103, drive control for the linear vibration motor 100, i.e., frequency-following control for controlling the frequency of the driving current so as to make the supply power Pa to the inverter maximum, is carried out according to the operation flow shown in FIG. 9(*a*).

In the supply current amplitude determining unit 7, the target current amplitude value i" is read from the memory (step S1), and an amplitude command signal Oam indicating the target current amplitude value i" is output. When changing the target current amplitude value i" in accordance with the load conditions of the linear vibration motor 100, the supply current amplitude determining unit 7 creates a target current amplitude value i" according to the load conditions, and outputs an amplitude command signal Oam indicating the created target current amplitude value i".

Next, in the comparative current waveform creation unit 8, a comparative current waveform having an amplitude value (comparative amplitude value) i' equal to the target current amplitude value i" indicated by the amplitude command signal Oam, and a frequency equal to the driving frequency ω indicated by the frequency command signal Ofr, is created on the basis of the amplitude command signal Oam from the supply current determining unit 7 and the frequency command signal Ofr from the driving frequency determining unit 6c, and a comparative current waveform signal Fcw indicating the comparative current waveform (comparative current instantaneous value) I'(t) is output (step S2). However, in the state where the driving frequency ω is not yet determined by the driving frequency determining unit 6c immediately after the start of the motor drive, an initial value ωinti of a prepared driving frequency is used as the driving frequency ω.

In the inverter controller 9, upon receipt of the detection signal Dsc from the supply current detector 3 and the waveform signal Fcw from the comparative current waveform creation unit 8, an output voltage (inverter supply voltage) Vd of the inverter 2 is determined on the basis of the detected voltage instantaneous value I(t) indicated by the supply current detection signal Dsc and the comparative current instantaneous value I'(t) indicated by the comparative current waveform signal Fcw. The inverter 2 generates the output voltage Vd in accordance with the control signal Sic from the inverter controller 9, and the output voltage Vd is applied to the linear vibration motor 100 as a driving voltage. In other words, a current according to the comparative current waveform is applied to the linear vibration motor 100 (step S3).

In the supply voltage calculator 5, a power Pa to be supplied to the linear vibration motor 100 is calculated from the supply voltage detection signal Dsv outputted from the supply voltage detector 4 and the supply current detection signal Dsc outputted from the supply current detector 3 (step S4).

Further, in the driving frequency determining unit 6c, the frequency ω of the inverter supply current Cd is adjusted under the state where the amplitude value i of the AC current (inverter supply current) Cd to be supplied to the linear vibration motor 100 is constant, i.e., under the state where the amplitude value i is maintained at the target amplitude value i" (=comparative amplitude value i'), to search for a maximum power frequency ωpmax at which the supply power Pa to the inverter becomes maximum (step S5).

Subsequently, in the driving frequency determining unit 6c, it is judged whether or not the power Pa to be supplied to the linear vibration motor has reached the maximum value under the state where the amplitude i of the inverter supply current Cd is maintained at the current target amplitude value i" (step S6). When it is judged in step S6 that the supply power Pa has not reached the maximum value, the process of searching for the maximum power frequency ωpmax (steps S2~S6) is again carried out. On the other hand, when it is judged in step S6 that the supply power Pa has reached the maximum value, the target current amplitude value i" is re-determined (step S1), and subsequently, the process of searching for the maximum power frequency ωpmax at which supply power Pa to the inverter becomes maximum (steps S2–S6) is carried out under the state where the amplitude value i of the inverter supply current Cd is maintained at the redetermined target current amplitude value i" (comparative amplitude value i').

Next, the operation of the driving frequency determining unit 6c will be described in detail.

Figure 10:
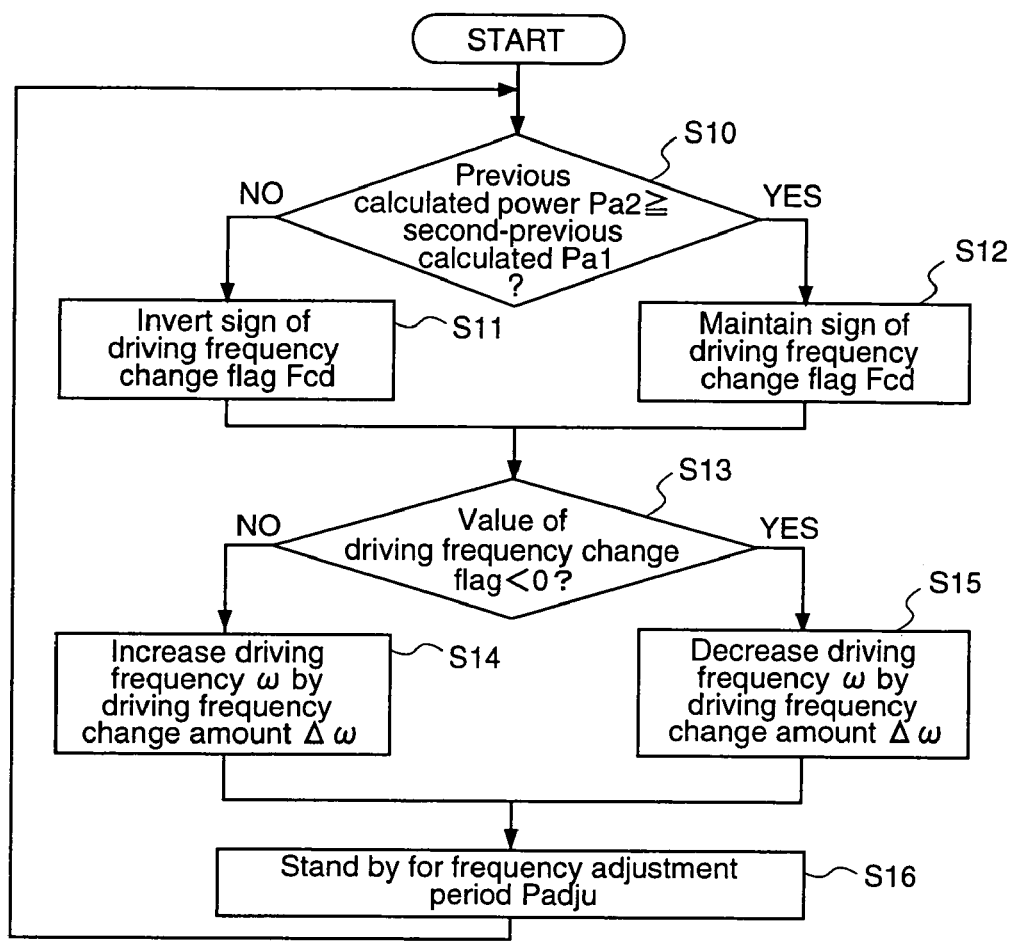
FIG. 10 is a flowchart illustrating process steps to be performed by a driving frequency determining unit in the motor drive control apparatus according to the third embodiment.

FIG. 10 is a flowchart illustrating the operation of the driving frequency determining unit 6c.

Under the state where the amplitude value i of the AC current (inverter supply current) Cd to be supplied to the linear vibration motor 100 is maintained constant, the relationship between the frequency co of the inverter supply current and the supply current Pa to the motor is a secondary convex function. Accordingly, as a method of searching for the frequency ωpmas at which the supply current Pa becomes maximum, the maximum grade method (hill climbing method) is effective because the secondary convex function has only one extreme value.

Hereinafter, a description will be given of the process of searching for the frequency (maximum power frequency) ωpmax at which the supply power Pa becomes maximum, by the maximum grade method, utilizing two variables, i.e., a frequency adjustment period Padju and a frequency change amount Δω, and a flag Fcd.

The maximum power frequency ωpmax of the inverter supply current Cd is equal to the resonance frequency ωreso of the linear vibration motor 100. Further, the frequency adjustment period Padjust is a period during which the driving frequency determining unit 6c performs frequency adjustment (i.e., determination of driving frequency ω), and the frequency change amount Δω is an amount of change of the driving frequency ω in a one-time frequency adjustment by the driving frequency determining unit 6c. Furthermore, the flag Fcd shows the direction of change of the driving frequency determined by the driving frequency determining unit 6c, and a value [1] of the flag Fcd indicates an increase in frequency while a value [−1] of the flag Fcd indicates a decrease in frequency.

Initially, in the driving frequency determining unit 6c, the supply power Pa1 to the linear vibration motor 100 which is calculated by the supply power calculator 5 when the frequency of the inverter supply current Cd is the frequency determined by the second previous frequency adjustment, is compared with the supply power Pa2 which is calculated by the supply power calculator 5 when the frequency of the inverter supply current Cd is the frequency determined by the previous frequency adjustment (step S10).

When the power Pa2 obtained by the previous frequency adjustment is smaller than the power Pa1 obtained by the second-previous frequency adjustment, the value of the driving frequency change direction flag Fcd is inverted between plus and minus (step S11). The reason is as follows. The fact that the power Pa2 obtained by the previous adjustment is smaller than the power Pa1 obtained by the second-previous adjustment indicates that the frequency ω of the supply current to the linear vibration motor 100 is changed in the direction in which the frequency ω goes away from the resonance frequency ωreso of the linear vibration motor in the previous adjustment. Further, when the power Pa2 obtained by the previous adjustment is equal to or larger than the power Pa1 obtained by the second-previous adjustment, the value of the driving frequency change direction flag Fcd is maintained as it is (step S12). The reason is as follows. The fact that the power Pa2 obtained by the previous adjustment is equal to or larger than the power Pa2 obtained by the second-previous adjustment indicates that the previously determined driving frequency ω is changed in the direction in which the frequency ω approaches the resonance frequency ωreso of the linear vibration motor 100, or in the direction in which the difference between the driving frequency ω and the resonance frequency ωreso does not change.

Next, in the driving frequency determining unit 6c, it is judged whether or not the value of the driving frequency change direction flag Fcd is negative (step S13). When it is judged in step S13 that the value of the flag Fcd is not negative, the driving frequency ω of the linear vibration motor 100 is changed to a value that is increased by the driving frequency change amount Δω, and the changed driving frequency is determined as a new driving frequency ω (step S14). Conversely, when the value of the driving frequency change direction flag Fcd is negative, the driving frequency ω of the linear vibration motor 100 is changed to a value that is decreased by the driving frequency change amount Δω, and the changed frequency is determined as a new frequency of the driving current (step S15).

In the driving frequency determining unit 6c, when this frequency adjustment is ended, the operation goes into a standby state for a predetermined period of time (step S16), and when the predetermined period has passed, the next frequency adjustment is carried out (steps S10–S16). The period during which the operation of the driving frequency determining unit 6 is in the standby state is equal to a time obtained by subtracting a time required for a one-time frequency adjustment from the frequency adjustment period Padju.

In the driving frequency determining unit 6c, when there is no power value corresponding to the previous or second-previous frequency adjustment (e.g., when the linear vibration motor is in the stating state), a preset value is employed.

As described above, in the driving frequency determining unit 6c, frequency adjustment for changing the driving frequency ω of the AC current to be supplied to the linear vibration motor 100 by each frequency change amount Δω is carried out for every frequency adjustment period Padju, and thereby the driving frequency ω follows the frequency (maximum power driving frequency) ωpmax at which the power Pa to be supplied to the linear vibration motor 100 becomes maximum.

When the load of the linear vibration motor 100 is unstable, the power Pa supplied to the linear vibration motor 100 might be changed even though the driving frequency ω is not changed, leading to a possibility that the driving frequency determining unit 6 might change the driving frequency ω of the linear vibration motor 100 in the direction that beings the driving frequency ω out of the maximum power frequency ωpmax.

Accordingly, the driving frequency determining unit 6c performs frequency adjustment for changing the driving frequency ω in one direction continuously by a predetermined number of times, i.e., at least two times. As a result of the predetermined times of frequency adjustment, when the supply power Pa is changed by an amount larger than a predetermined reference amount of change, the driving frequency obtained before the predetermined number of frequency adjustment is maintained, i.e., the driving frequency is not changed until the load is stabilized.

Thereby, even when the load is unstable, the possibility that the driving frequency determining unit 6c changes the driving frequency ω in the direction that brings the driving frequency ω away from the maximum power frequency ωpmax is decreased, resulting in a stable operation of the linear vibration motor. The above-described reference amount of change to be a reference of the amount of change in the supply power by the continuous predetermined number of frequency adjustment may be a predetermined constant value, or it may be a value based on the actual supply power at a predetermined point in time, specifically, a value corresponding to 10% of the supply power at a point in time when the driving frequency is determined by the frequency adjustment.

Furthermore, when the amount of change in the supply power due to the frequency adjustment is large, since the driving frequency ω at this point of time is considered to be apart from the maximum power frequency ωpmax, the frequency adjustment period Padju should be reduced. Conversely, when the amount of change in the supply power due to the frequency adjustment is small, since the linear vibration motor is considered to be driven at a driving frequency ω close to the maximum power frequency ωpmax, the frequency adjustment period Padju should be increased. Thereby, control for making the driving frequency follow the maximum power frequency can be carried out at high speed and high stability.

Further, in the above-described motor drive control apparatus, the driving frequency determining unit 6c always changes the driving frequency ω and monitors the driving frequency ωpmax at which the maximum power is obtained. Consequently, there may be cases where the driving frequency ω changes with a latitude corresponding to the frequency change amount Δω, with the driving frequency ωmax in the center, in the frequency adjustment period Padju. Therefore, the operation of the linear vibration motor in an area where the driving frequency ω is apart from the driving frequency ωpmax at which the maximum power is obtained, cannot be ignored.

Accordingly, when the amount of change in the supply power due to the frequency adjustment is considerable, since the driving frequency ω is considered to be apart from the maximum power frequency ωpmax, the driving frequency change amount Δω should be increased. When the amount of change in the supply power due to the frequency adjustment is small, since the linear vibration motor is considered to be driven at a driving frequency ω close to the maximum power frequency ωpmax, the driving frequency change amount Δω should be reduced. Thereby, the control for making the driving frequency ω follow the maximum power frequency ωpmax can be carried out at high speed and high stability.

Hereinafter, the characteristics of the linear vibration motor control method according to the third embodiment will be briefly described using formulae (7) and (8) indicating the theoretical support therefor.

The relationship between the energy (supply power) inputted to the linear vibration motor 100 and the energy outputted from the linear vibration motor 100 is represented by $$Pin = Pout + \frac{1}{2} \times R \times i^2 \qquad (7)$$

wherein Pout is the average output energy of the linear vibration motor, Pin is the average input energy of the linear vibration motor, R is the equivalent resistance existing in the linear vibration motor, and i is te actual amplitude value of the AC current (inverter supply current) Cd to be supplied to the linear vibration motor. The average input energy Pin of the linear vibration motor corresponds to the above-described supply power of the inverter 2, that is, the power Pa calculated by the supply power calculator 5.

As can be seen from formula (7), the loss in the linear vibration motor 100 is Joule heat due to the equivalent resistance R existing in the linear vibration motor. Assuming that the value of the equivalent resistance R is constant, the loss is determined by only the amplitude value regardless of the frequency ω of the supply current Cd.

Further, the ratio η between the average output energy Pout and the average input energy Pin (hereinafter also referred to as overall efficiency) is represented by $$\eta = \frac{Pout}{Pin} = 1 - \frac{1}{2} \times \frac{R \times i^2}{Pin} \quad (8)$$

Since driving the linear vibration motor 100 in the resonance state is equivalent to driving the linear vibration motor 100 at the maximum efficiency, the resonance frequency ωreso can be detected by controlling the driving efficiency ω of the linear vibration motor 100 so as to maximize the overall efficiency η.

As can be seen from formula (8), the overall efficiency n of the linear vibration motor 100 can be maximized by maximizing the average input current energy Pin when the amplitude value i of the supply current Cd is fixed.

As can be seen from formula (7), when the amplitude value i of the supply current Cd is fixed, maximizing the average input energy Pin to the linear vibration motor 100 is equivalent to maximizing the average output energy Pout.

As described above, when the frequency ω of the supply current is adjusted so as to maximize the average input energy (i.e., the inverter supply power) Pa to the linear vibration motor 100 under the state where the amplitude value i of the AC current (inverter supply current) Cd to be supplied to the linear vibration motor is constant, the linear vibration motor 100 is driven at the resonance frequency ωreso, whereby the linear vibration motor can be driven with high efficiency.

The method for detecting the resonance frequency will be described by another expression as follows.

Since the current (inverter supply current) Cd to be supplied to the linear vibration motor 100 is in proportion to the force which excites the mover of the linear vibration motor 100, changing the frequency ω of the inverter supply current with the amplitude value i of the supply current Cd being constant is equivalent to changing the vibration frequency of the mover with the exciting force being maintained constant. Accordingly, detecting the maximum power frequency ωpmax by adjusting the frequency ω of the supply current so as to maximize the average input energy (i.e., the inverter supply current) Pa to the linear vibration motor while maintaining the amplitude value of the supply current constant, is equivalent to detecting the resonance frequency ωreso by adjusting the vibration frequency so that the linear vibration motor works at maximum efficiency while maintaining the exciting force constant. The linear vibration motor 100 working at maximum efficiency is equivalent to that the speed of the mover of the linear vibration motor becoming maximum, or that the output energy of the linear vibration motor becoming maximum.

As described above, the motor drive control apparatus 103 according to the third embodiment of the invention is provided with: the calculator 5 for calculating the supply power Pa to the linear vibration motor 100 on the basis of the detection outputs Dsc and Dsv of the current Cd and voltage Vd to be supplied to the linear vibration motor 100; the determining unit 7 for determining the target amplitude value i" of the current Cd to be supplied to the linear vibration motor; and the determining unit 6c for adjusting the driving frequency ω so that the driving frequency ω approaches the resonance frequency at which the calculated supply power Pa becomes maximum, while maintaining the amplitude value i of the supply current at the target amplitude value i. Further, the voltage Vd to be supplied from the inverter 2 to the linear vibration motor 100 is controlled so that the comparative current waveform I'(t) having the adjusted driving frequency ω and the amplitude value i' equal to the target amplitude value i" matches the waveform I(t) of the supply current to the linear vibration motor 100. Therefore, the resonance frequency of the linear vibration motor 100 can be accurately detected without using a sensor for detecting, for example, displacement, speed, or acceleration of the mover of the linear vibration motor 100. Thereby, the linear vibration motor 100 can be driven at high efficiency regardless of load fluctuations, without the necessity of incorporating a sensor, which undesirably leads to an increase in size, and unnecessary restrictions such as securing operation reliability of the sensor.

While the detectors 3 and 4, the calculator 5, the determining units 6 and 7, the creation unit 8, and the inverter controller 9 are implemented by software in this third embodiment, these units may be implemented by hardware.

Further, in this third embodiment, the supply current amplitude determining unit 7 performs the amplitude determining process of determining the target current amplitude vale i" according to the operating conditions or load conditions of the linear vibration motor 100, every time the frequency of the inverter supply current Cd is judged to be equal to the maximum power frequency at which the supply power becomes maximum with the determined target current amplitude value i". However, the supply current amplitude determining unit 7 may perform the amplitude determining process not only when the frequency of the inverter supply current Cd is judged to be equal to the maximum power frequency at which the supply power becomes maximum with the determined target current amplitude value i", but also when a predetermined period of time has passed from the previous amplitude determining process.

Figure 9A:
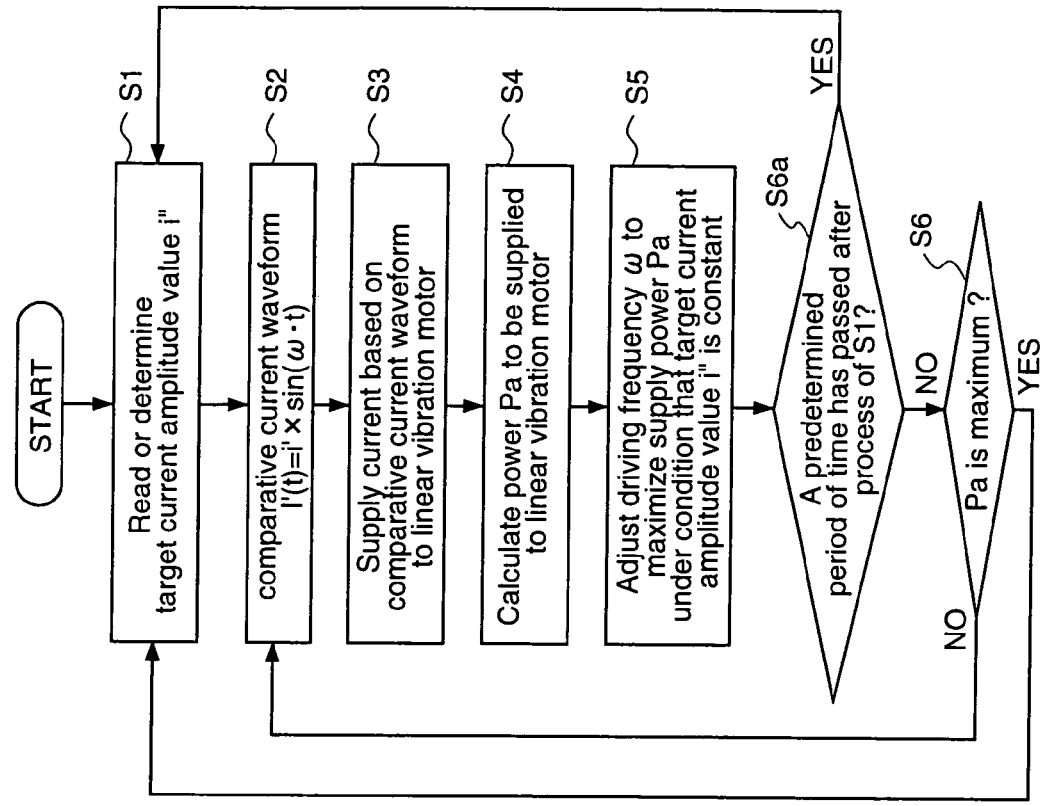
FIGS. 9(a) and 9(b) are diagrams illustrating examples of operation flows for controlling a linear vibration motor by the motor drive control apparatus according to the third embodiment.
Figure 9B:
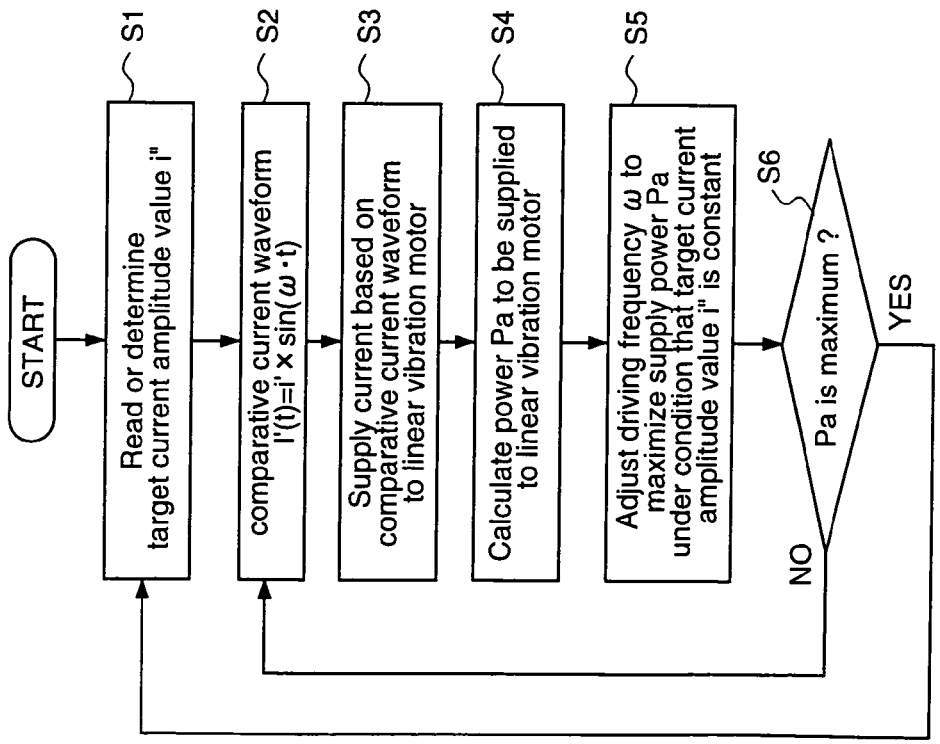

In this case, in the driving frequency determining unit 6c, as shown in FIG. 9(b), before the frequency judgement as to whether or not the frequency of the inverter supply current Cd is the maximum power frequency at the determined target current amplitude value i" (step S6), a time judgement as to whether or not a predetermined period of time has passed after the previous amplitude determination (step S1) is carried out (step S6a). Then, in the supply current amplitude determining unit 7, an amplitude determination for determining the target current amplitude value i" according to the operating conditions or load conditions of the linear vibration motor 100 is carried out not only when the frequency of the inverter supply current Cd has reached the maximum power frequency at the determined target amplitude value i", but also when the predetermined period of time has passed after the previous amplitude determination (step S1).

Steps S1–S6 in FIG. 9(b) are identical to those of the third embodiment shown in FIG. 9(a).

As described above, when a predetermined period of time or more has passed after the previous amplitude determining process, the next amplitude determining process is carried out regardless of whether or not the frequency of the inverter supply current Cd has reached the maximum power frequency at the determined target current amplitude value i", whereby the responsivity of drive control for the linear vibration motor 100 can be improved.

For example, when a considerable amount of time is needed to bring the frequency of the inverter supply current Cd to the maximum power frequency ωpmax by the frequency adjusting process in the state where the actual amplitude value (the amplitude value of the inverter supply current Cd) is maintained at the determined target current amplitude value i", or when the change in the operating conditions or load conditions of the linear vibration motor 100 is considerable, the determined target current amplitude value i" deviates from the amplitude value according to the operating conditions or load conditions of the linear vibration motor 100, whereby stability and responsivity of drive control for the linear vibration motor 100 cannot be maintained at high levels.

Even when it takes a considerable amount of time to make the frequency of the inverter supply current Cd follow the maximum power frequency ωpmax as described above, by repeating the amplitude determining process at regular intervals regardless of whether or not the frequency of the inverter supply current Cd has reached the maximum power frequency at the determined target current amplitude value i" as shown in FIG. 9(b), stability and responsivity of drive control for the linear vibration motor can be maintained at high levels.

Fourth Embodiment

Figure 11:
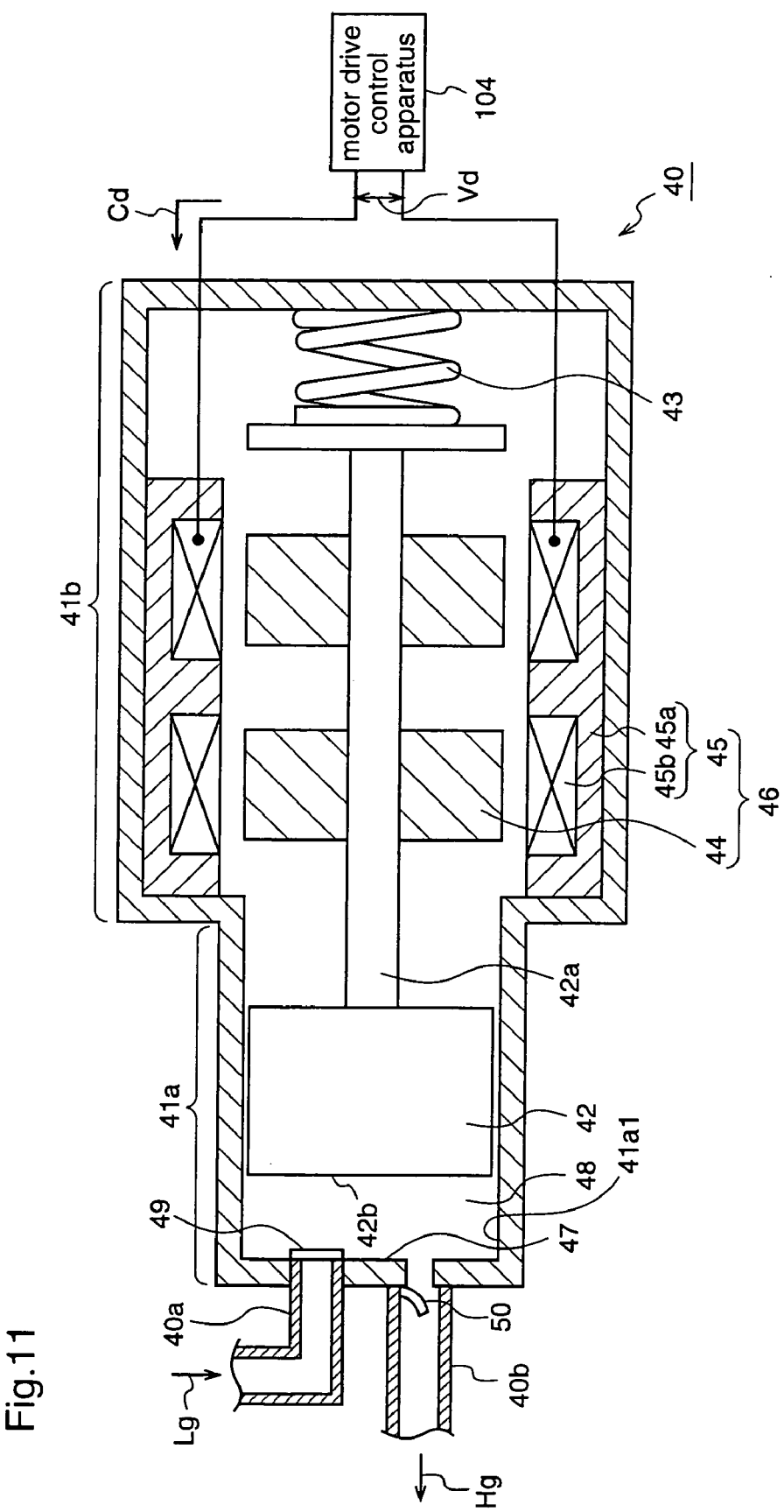
FIG. 11 is a schematic diagram for explaining a motor drive control apparatus according to a fourth embodiment of the present invention.

FIG. 11 is a schematic diagram for explaining a compressor drive apparatus according to a fourth embodiment of the present invention.

A compressor drive apparatus 104 according to the fourth embodiment drives and controls a compressor 40 for compressing air, gas, and the like. A power source of the compressor 40 is a linear vibration motor 46 which is identical to the linear vibration motor 100 according to the first embodiment. Further, the compressor drive apparatus 104 is a motor drive control apparatus for driving and controlling the linear vibration motor 46, and it is identical in construction to the motor drive control apparatus 103 according to the third embodiment. Hereinafter, the compressor 40 according to this fourth embodiment is called a linear compressor, and this linear compressor 40 will be briefly described.

The linear compressor 40 has a cylinder section 41a and a motor section 41b which are adjacent to each other along a predetermined axis line. In the cylinder section 41a, a piston 42 is placed so as to be slidably supported along the axis direction. A piston rod 42a having an end which is fixed to the rear side of the piston 42 is placed across the cylinder section 41a and the motor section 41b, and a support spring (resonance spring) 43 which applies a force to the piston rod 42a in the axis direction is provided on the other end of the piston rod 42a.

Further, a magnet 44 is fixed to the piston rod 42a, and an electromagnet 45 comprising an outer yoke 45a and a stator coil 45b embedded in the outer yoke 45a is fixed to a portion of the motor section 41b which is opposed to the magnet 44. In this linear compressor 40, the linear vibration motor 46 is constituted by the electromagnet 45 and the magnet 44 fixed to the piston rod 42a. Accordingly, in the linear compressor 40, the piston 42 reciprocates along its axis direction due to an electromagnetic force generated between the electromagnet 45 and the magnet 44, and elasticity of the spring 43.

Further, in the cylinder section 41a, a compression chamber 48 is formed, which is a closed space surrounded by a cylinder upper portion inner wall 47, a piston compression wall 42b, and a cylinder peripheral wall 41a1. An end of a gas inlet tube 40a for sucking a low-pressure gas Lg from a gas flow path into the compression chamber 48 is opened at the cylinder upper portion inner wall 47. Further, an end of a discharge tube 40b for discharging a high-pressure gas Hg from the compression chamber 48 to the gas flow path is opened at the cylinder upper portion inner wall 47. An inlet valve 49 and a discharge valve 50 for preventing back flow of the gas are fixed to the inlet tube 40a and the discharge tube 40b, respectively.

Figure 8:
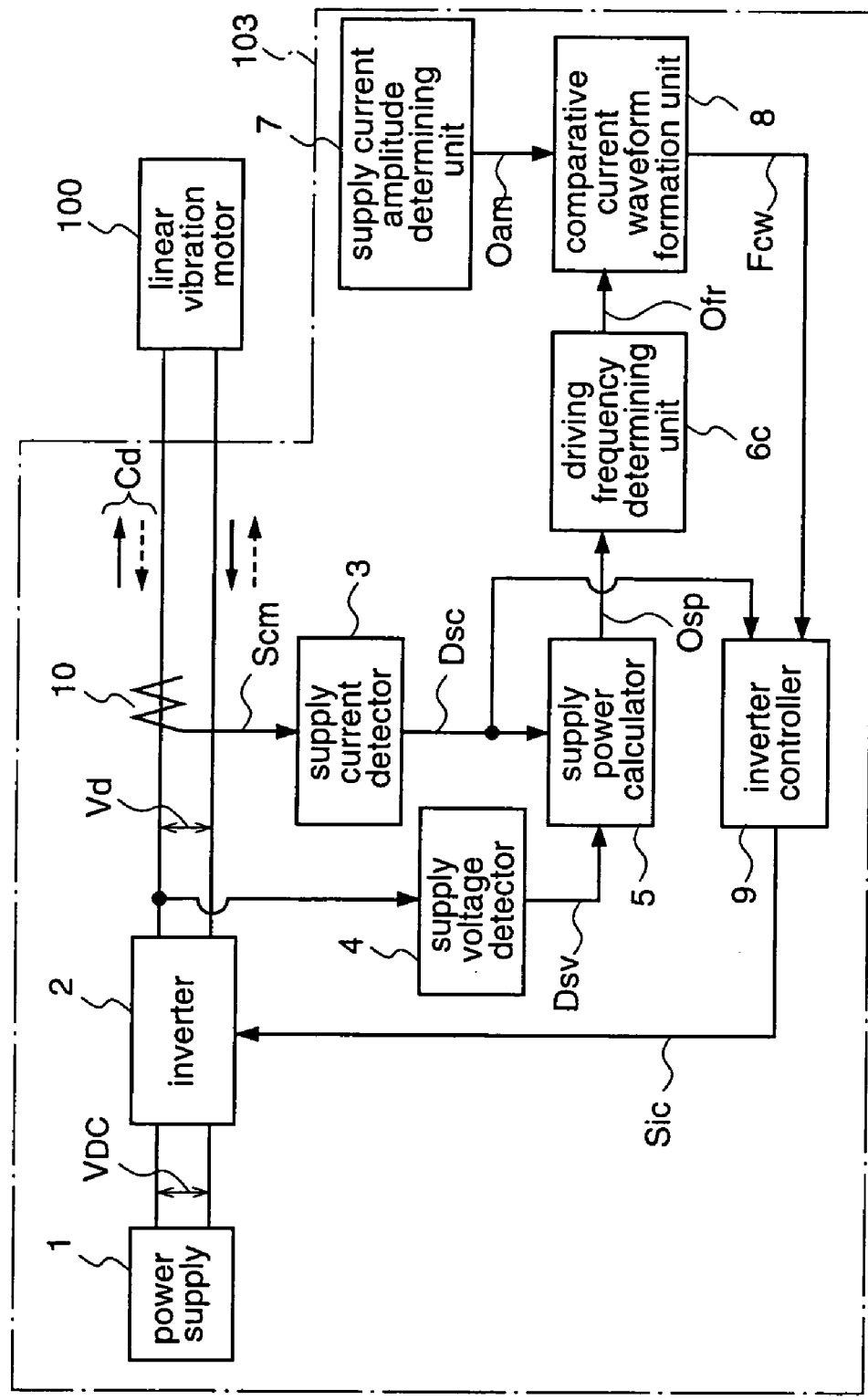
FIG. 8 is a block diagram for explaining a motor drive control apparatus according to a third embodiment of the present invention.

The motor drive control apparatus 104 supplies the linear vibration motor 46 of the compressor 40 with a driving current Cd and a driving voltage Vd. That is, the motor drive control apparatus 104 includes, as shown in FIG. 8, a power supply 1, an inverter 2, a supply current detector 3, a supply voltage detector 4, a supply voltage calculator 5, a driving frequency determining unit 6c, a supply current amplitude determining unit 7, a comparative current waveform creation unit 8, and an inverter controller 9, similar to the motor drive control apparatus according to the third embodiment. The motor drive control apparatus 104 calculates a supply power Pa to the linear vibration motor 46 on the basis of the supply current Cd and the applied voltage Vd to the linear vibration motor 46, and adjusts a frequency ω of the AC current Cd so that the calculated supply power Pa becomes maximum, while maintaining an amplitude value i of the AC current as the supply current Cd at a target amplitude value i", thereby to determine the frequency a).

In the linear compressor 40 so constructed, the piston 42 reciprocates in its axis direction by an intermittent supply of the driving current Cd from the motor drive control apparatus 104 to the linear vibration motor 46, whereby suction of the low-pressure gas Lg into the compression chamber 48, compression of the gas in the compression chamber 48, and discharge of the compressed high-pressure gas Hg from the compression chamber 48 are repeatedly carried out. Under the state where the linear compressor 40 is operating, the supply current Cd and the applied voltage Vd to the linear vibration motor 46 as a drive source of the linear compressor 40 are detected, and the supply power Pa to the linear vibration motor 46 is calculated on the basis of the detected supply current Cd and applied voltage Vd. Furthermore, the frequency ω of the AC current as the supply current Cd is determined so that the calculated supply power Pa becomes maximum, under the state where the amplitude value i of the AC current Cd is maintained at the target amplitude value i".

As described above, according to the linear compressor 40 of the fourth embodiment, as in the third embodiment, the frequency ω of the AC current Cd to be supplied to the linear vibration motor 46 as a power source for the linear compressor 40 is determined so that the calculated supply power Pa becomes maximum, under the state where the amplitude i of the AC current as the supply current Cd is maintained at the target amplitude value i". Therefore, the resonance frequency of the linear vibration motor 46 can be accurately detected without using a sensor for detecting, for example, displacement, speed, or acceleration of its mover. Thereby, it is possible to realize a linear compressor which can drive and control the linear vibration motor 46 as a power source, at a high efficiency regardless of load fluctuations, without the necessity of incorporating a sensor, which undesirably leads to an increase in size, and unnecessary restrictions such as securing operation reliability of the sensor.

Fifth Embodiment

Figure 12:
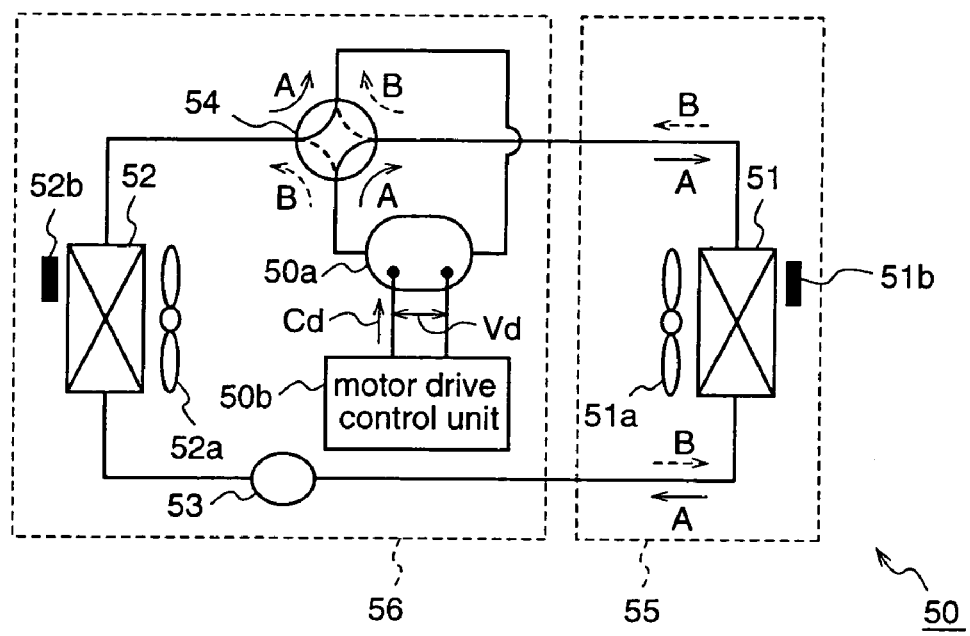
FIG. 12 is a schematic diagram for explaining an air conditioner according to a fifth embodiment of the present invention.

FIG. 12 is a block diagram for explaining an air conditioner according to a fifth embodiment of the present invention.

An air conditioner 50 according to the fifth embodiment has an indoor unit 55 and an outdoor unit 56, and performs cooling or heating. The air conditioner 50 is provided with a compressor 50a for circulating a refrigerant between the indoor unit 55 and the outdoor unit 56, and a compressor drive unit 50*b* for driving the compressor 50*a*. The compressor 50*a* is identical to the linear compressor 40 having the linear vibration motor 46 according to the fourth embodiment. Further, the compressor drive unit 50*b* drives and controls a linear vibration motor of the compressor 50*a*, and it is identical in construction to the motor drive control apparatus 104 according to the fourth embodiment. In this fifth embodiment, the compressor 50*a* is referred to as a linear compressor 50*a*, and the compressor drive unit 50*b* is referred to as a motor drive control unit 50*b*.

More specifically, the air conditioner 50 includes the linear compressor 50*a* for forming a refrigerant circulation path, a throttle (expansion valve) 53, an indoor heat exchanger 51, an outdoor heat exchanger 52, and the motor drive control unit 50*b* for driving and controlling the motor as a drive source of the linear compressor 50*a*. The indoor heat exchanger 51 constitutes the indoor unit 55, while the throttle 53, the outdoor heat exchanger 52, the linear compressor 50*a*, a four-way valve 54, and the motor drive control unit 50*b* constitute the outdoor unit 52.

The indoor heat exchanger 51 has an air blower 51*a* for increasing the efficiency of heat exchange, and a temperature sensor 51*b* for measuring the temperature of the heat exchanger 51 or the ambient temperature thereof. The outdoor heat exchanger 52 has an air blower 52*a* for increasing the efficiency of heat exchange, and a temperature sensor 52*b* for measuring the temperature of the heat exchanger 52 or the ambient temperature thereof.

In this fifth embodiment, the linear compressor 50*a* and the four-way valve 54 are placed in the refrigerant path between the indoor heat exchanger 51 and the outdoor heat exchanger 52. That is, in this air conditioner 50, the four-way valve 54 selects either of two states as follows: (1) the state where the refrigerant that has passed through the outdoor heat exchanger 52 is sucked into the linear compressor 50*a*, and the refrigerant discharged from the linear compressor 50*a* is supplied to the indoor heat exchanger 51 (i.e., the state where the refrigerant flows in the direction of arrow A); and (2) the state where the refrigerant that has passed through the indoor heat exchanger 51 is sucked into the linear compressor 50*a*, and the refrigerant discharged from the linear compressor 50*a* is supplied to the outdoor heat exchanger 52 (i.e., the state where the refrigerant flows in the direction of arrow B).

Further, the throttle 53 has both the function of reducing the flow rate of the circulating refrigerant, and the function as a valve for automatically controlling the flow rate of the refrigerant (automatic control valve). That is, under the state where the refrigerant is circulating in the refrigerant circulation path, the throttle 53 reduces the flow rate of the fluid refrigerant outputted from a condenser to an evaporator to expand the fluid refrigerant, and supplies a proper amount of refrigerant that is required for the evaporator.

The indoor heat exchanger 51 operates as a condenser during heating and as an evaporator during cooling. The outdoor heat exchanger 52 operates as an evaporator during heating and as a condenser during cooling. In the condenser, the high-temperature and high-pressure refrigerant gas flowing therein loses heat to the air blown into the condenser, and gradually liquefies, resulting in a high-pressure fluid refrigerant in the vicinity of the outlet of the condenser. This is equivalent to the refrigerant radiating heat into the air to liquefy. Further, the fluid refrigerant whose temperature and pressure are reduced by the throttle 53 flows into the evaporator. When the indoor air is blown into the evaporator in this state, the fluid refrigerant takes a great amount of heat from the air and evaporates, resulting in a low-temperature and low-pressure gas refrigerant. The air which has lost a great amount of heat in the evaporator is discharged as cool air from the blowoff port of the air conditioner.

Next, the operation of the air conditioner 50 will be described.

In the air conditioner 50 according to the fifth embodiment, when a driving current Cd is supplied from the motor drive control unit 50*b* to the linear compressor 50*a*, the refrigerant circulates in the refrigerant circulation path, and heat exchange is carried out in the heat exchanger 51 of the indoor unit 55 and the heat exchanger 52 of the outdoor unit 56. That is, in the air conditioner 50, a well-known heat pump cycle is formed in the refrigerant circulation path by circulating the refrigerant sealed in the circulation path with the linear compressor 50*a*. Thereby, heating or cooling for a room is carried out.

For example, when the air conditioner 50 performs heating, the four-way valve 54 is set by a user operation so that the refrigerant flows in the direction of arrow A. In this case, the indoor heat exchanger 51 operates as a condenser, and discharges heat due to the circulation of the refrigerant in the refrigerant circulation path. Thereby, the room is heated.

Conversely, when the air conditioner 50 performs cooling, the four-way valve 54 is set by a user operation so that the refrigerant flows in the direction of arrow B. In this case, the indoor heat exchanger 51 operates as an evaporator, and absorbs heat from the ambient air due to the circulation of the refrigerant in the refrigerant circulation path. Thereby, the room is cooled.

The circulation rate of the refrigerant is controlled by using a target temperature that is set on the air conditioner, and an actual room temperature and outdoor temperature.

As described above, in the air conditioner 50 according to the fifth embodiment, since the compressor (linear compressor) 50*a* having the linear vibration motor as a power source is used as a compressor for compressing and circulating the refrigerant, friction loss in the compressor is reduced as compared with an air conditioner using a compressor having a rotation-type motor as a power source, and furthermore, sealability for sealing the high-pressure refrigerant and the low-pressure refrigerant in the compressor is enhanced, resulting an increase in efficiency of the compressor.

Furthermore, in the compressor 50*a* using the linear vibration motor according to the fifth embodiment, since friction loss is reduced, the amount of use of lubricating oil that is indispensable in the compressor using the rotation-type motor can be significantly reduced. Thereby, the amount of waste oil that needs recycling or the like can be reduced, and the amount of refrigerant to be filled in the compressor can be reduced because the amount of refrigerant that dissolves into the oil is reduced, resulting in a contribution to conservation of the global environment.

Further, since the temperature and pressure in the compressor are high and the compressor is filled with chemical substances such as oil and refrigerant, when a position sensor for detecting the position of the mover or the like is employed, reliability of the sensor becomes a great problem. In this fifth embodiment, however, the frequency $\omega$ of the AC current as the driving current of the linear vibration motor is determined so that the supply voltage Pa calculated from the driving current Cd an the driving voltage Vd becomes maximum, under the state where the amplitude value i of the AC current is maintained at the target amplitude value i". Therefore, the linear vibration motor can be driven with high efficiency without using a sensor for detecting, for example, displacement, speed, or acceleration of the mover.

As a result, the linear vibration motor can be driven and controlled with high efficiency regardless of load fluctuations in the compressor, without the necessity of incorporating a sensor, which undesirably leads to increases in size and cost, and unnecessary restrictions such as securing operational reliability of the sensor.

Sixth Embodiment

Figure 13:
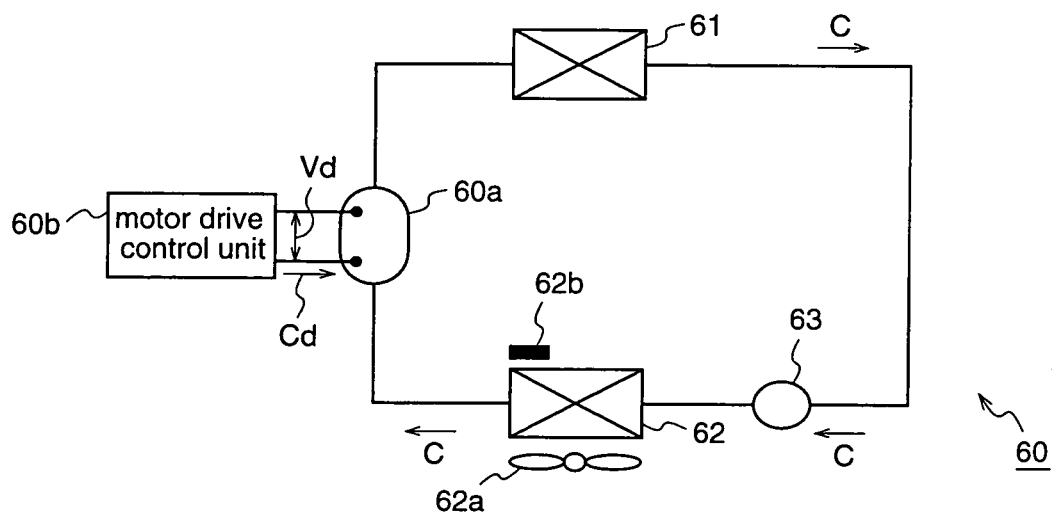
FIG. 13 is a schematic diagram for explaining a refrigerator according to a sixth embodiment of the present invention.

FIG. 13 is a block diagram for explaining a refrigerator according to a sixth embodiment of the present invention.

A refrigerator 60 of this sixth embodiment comprises a linear compressor 60a, a compressor drive unit 60b, a condenser 61, an evaporator 62, and a throttle 63.

The linear compressor 60a, the condenser 61, the throttle 63, and the evaporator 62 form a refrigerant circulation path, and the compressor drive unit 60b drives and controls a linear vibration motor as a drive source of the linear compressor 60a. The linear compressor 60a is identical to the linear compressor 40 having the linear vibration motor 46 according to the fourth embodiment. The compressor drive unit 60b is identical in construction to the motor drive control apparatus 104 according to the fourth embodiment, and is hereinafter referred to as a motor drive control unit 60b.

Similar to the throttle 53 of the air conditioner according to the fifth embodiment, the throttle 63 reduces the flow rate of the fluid refrigerant outputted from the condenser 61 to expand the fluid refrigerant, and supplies a proper amount of refrigerant to the evaporator 62, under the state where the refrigerant is circulating in the refrigerant circulation path.

The condenser 61 condenses the high-temperature and high-pressure refrigerant gas flowing therein, and discharges heat of the refrigerant into the outside air. The refrigerant gas sent into the condenser 61 loses heat to the outside air and gradually liquefies, resulting in a high-pressure fluid refrigerant in the vicinity of the outlet of the condenser.

The evaporator 62 evaporates the low-temperature fluid refrigerant to cool the inside of the refrigerator. The evaporator 62 has an air blower 62a for increasing efficiency of heat exchange, and a temperature sensor 62b for detecting the temperature inside the refrigerator.

Next, the operation of the refrigerator 60 will be described.

In the refrigerator 60, when a driving current Cd and a driving voltage Vd are supplied from the motor drive control unit 60b to the linear vibration motor of the linear compressor 60a, the linear compressor 60a is driven and the refrigerant circulates in the refrigerant circulation path in the direction of arrow C, and thereby heat exchange is carried out in the condenser 61 and the evaporator 62. Thus, the inside of the refrigerator 60 is cooled.

To be specific, the refrigerant is liquefied in the condenser 61, and the flow rate thereof is reduced by the throttle 63, whereby the refrigerant expands, resulting in a low-temperature fluid refrigerant. When the low-temperature fluid refrigerant is sent to the evaporator 62, the low-temperature fluid refrigerant is evaporated, whereby the inside of the refrigerator 60 is cooled. At this time, the air in the refrigerator 60 is compulsory sent to the evaporator 62 by the air blower 62a, whereby heat exchange is efficiently carried out in the evaporator 62.

As described above, in the refrigerator 60 according to the sixth embodiment, since the compressor (linear compressor) 60a having the linear vibration motor as a power source is used as a compressor for compressing and circulating the refrigerant, friction loss in the compressor is reduced as compared with a refrigerator using a compressor having a rotation-type motor as a power source, and furthermore, sealability for sealing the refrigerant in the compressor is enhanced, resulting an increase in operation efficiency of the compressor.

Furthermore, in the refrigerator 60 using the linear compressor 60a according to the sixth embodiment, since friction loss is reduced, the amount of waste oil (spent lubricating oil) and the amount of refrigerant to be filled in the compressor can be reduced, as in the air conditioner 50 of the fifth embodiment. Therefore, the refrigerator 60 can contribute to conservation of the global environment.

Further, in this sixth embodiment, the frequency $\omega$ of the AC current as the driving current of the linear vibration motor is determined so that the supply voltage Pa calculated from the driving current Cd an the driving voltage Vd becomes maximum, under the state where the amplitude value i of the AC current is maintained at the target amplitude value i". Therefore, similar to the fifth embodiment, the linear vibration motor can be driven and controlled with high efficiency regardless of load fluctuations in the compressor, without the necessity of incorporating a sensor, which undesirably leads to increases in size and cost, and restrictions such as securing operation reliability of the sensor.

Seventh Embodiment

Figure 14:
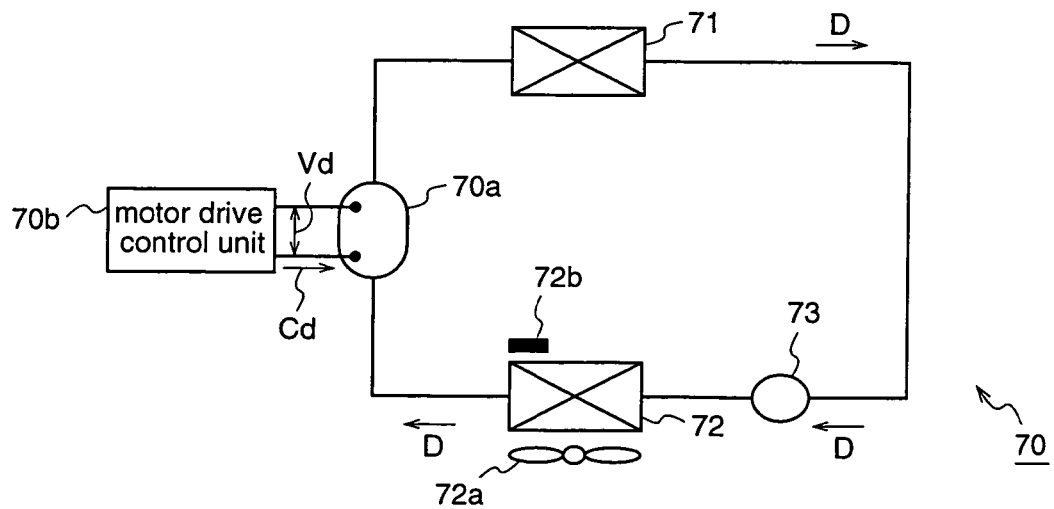
FIG. 14 is a schematic diagram for explaining a cryogenic freezer according to a seventh embodiment of the present invention.

FIG. 14 is a block diagram for explaining a cryogenic freezer according to a seventh embodiment of the present invention.

A cryogenic freezer 70 according to the seventh embodiment has a freezing chamber (not shown), and cools the inside of the chamber at a cryogenic temperature (lower than −50%). As for objects to be frozen by the cryogenic freezer 70, there are superconducting elements (electromagnetic circuit elements such as resistors, coils, magnets), electronic elements such as low-temperature reference parts for infrared sensors, medical objects such as blood and viscera, and foods such as tuna.

Electronic elements are preserved in the cryogenic states to increase their operating efficiencies or increase their sensitivities by removing thermal noises. As for foods, perishable foods are preserved in the cryogenic states to facilitate transportation, maintain freshness, or perform freeze-dry.

Although the freezing temperature of the cryogenic freezer 70 varies with applications, it is set at below −50° C. (centigrade) and, especially when the freezer 70 is used for superconducting, the temperature varies over a wide range of 0–100 K (Kelvin). For example, the freezing temperature of the cryogenic freezer 70 is set at about 50–100 K for high-temperature superconducting, and about 0–50 K for normal superconducting. Further, when the freezer 70 is used for maintaining freshness of foods or the like, the freezing temperature is set at a little under −50%.

Hereinafter, the operation of the cryogenic freezer 70 will be described.

The cryogenic freezer 70 comprises a linear compressor 70a, a compressor drive unit 70b, a heat radiator 71, a heat storage 72, and a throttle 73.

The linear compressor 70a, the heat radiator 71, the throttle 73, and the heat storage 72 form a refrigerant circulation path. The compressor drive unit 70b drives and controls a linear vibration motor as a drive source of the linear compressor 70*a*. The linear compressor 70*a* is identical to the linear compressor 40 having the linear vibration motor 46 according to the fourth embodiment. Further, the compressor drive unit 70*b* is identical in construction to the motor drive control apparatus 104 of the fourth embodiment, and the compressor drive unit 70*b* is hereinafter referred to as a motor drive control unit 70*b*.

The throttle 73 reduces the fluid refrigerant sent from the heat radiator 71 to the heat storage 72 to expand the fluid refrigerant, similar to the throttle 53 of the fifth embodiment.

The heat radiator 71 condenses the high-temperature and high-pressure refrigerant gas flowing therein, and discharges heat of the refrigerant to the outside air, similar to the condenser 61 of the sixth embodiment.

The heat storage 72 evaporates the low-temperature fluid refrigerant to cool the inside of the freezing chamber similar to the evaporator 62 of the sixth embodiment, thereby to preserve the objects at the cryogenic temperature. The heat storage 72 has a temperature sensor 72*b* for detecting the temperature of the objects. The heat storage 72 may have an air blower 72*a* for increasing efficiency of heat exchange as shown in FIG. 14.

In the cryogenic freezer 70, when a driving current Cd and a driving voltage Vd are supplied from the motor drive control unit 70*b* to the linear vibration motor of the linear compressor 70*a*, the linear compressor 70*a* is driven and the refrigerant circulates in the refrigerant circulation path along the direction of arrow D, and heat exchange is carried out in the heat radiator 71 and the heat storage 72. Thereby, the freezing chamber is cooled, and the objects in the chamber are frozen.

That is, the refrigerant is liquefied in the heat radiator 71, and the flow rate of the refrigerant is reduced by the throttle 57*e*, whereby the refrigerant is expanded to be a low-temperature fluid refrigerant. When the low-temperature fluid refrigerant is sent to the heat storage 72, the fluid refrigerant is evaporated, whereby the freezing chamber is cooled.

As described above, in the cryogenic freezer 70 according to the seventh embodiment, since the compressor (linear compressor) 70*a* having the linear vibration motor as a power source is used as a compressor for compressing and circulating the refrigerant, friction loss in the compressor is reduced as compared with a cryogenic freezer using a compressor having a rotation-type motor as a power source, and furthermore, the ability of the compressor for sealing the refrigerant is enhanced, resulting an increase in efficiency of the compressor.

Furthermore, in the cryogenic freezer 70 using the linear compressor according to the seventh embodiment, since friction loss is reduced, the amount of waste oil (spent lubricating oil) and the amount of refrigerant to be filled in the compressor can be reduced, as in the air conditioner 50 of the fifth embodiment. Therefore, the freezer 70 can contribute to conservation of the global environment.

Further, in this seventh embodiment, the frequency ω of the AC current as the driving current of the linear vibration motor is determined so that the supply voltage Pa calculated from the driving current Cd an the driving voltage Vd becomes maximum, under the state where the amplitude value i of the AC current is maintained at the target amplitude value i". Therefore, as in the fifth embodiment, the linear vibration motor can be driven and controlled with high efficiency regardless of load fluctuations in the compressor, without the necessity of incorporating a sensor, which undesirably leads to increases in size and cost, and unnecessary restrictions such as securing operation reliability of the sensor.

Eighth Embodiment

Figure 15:
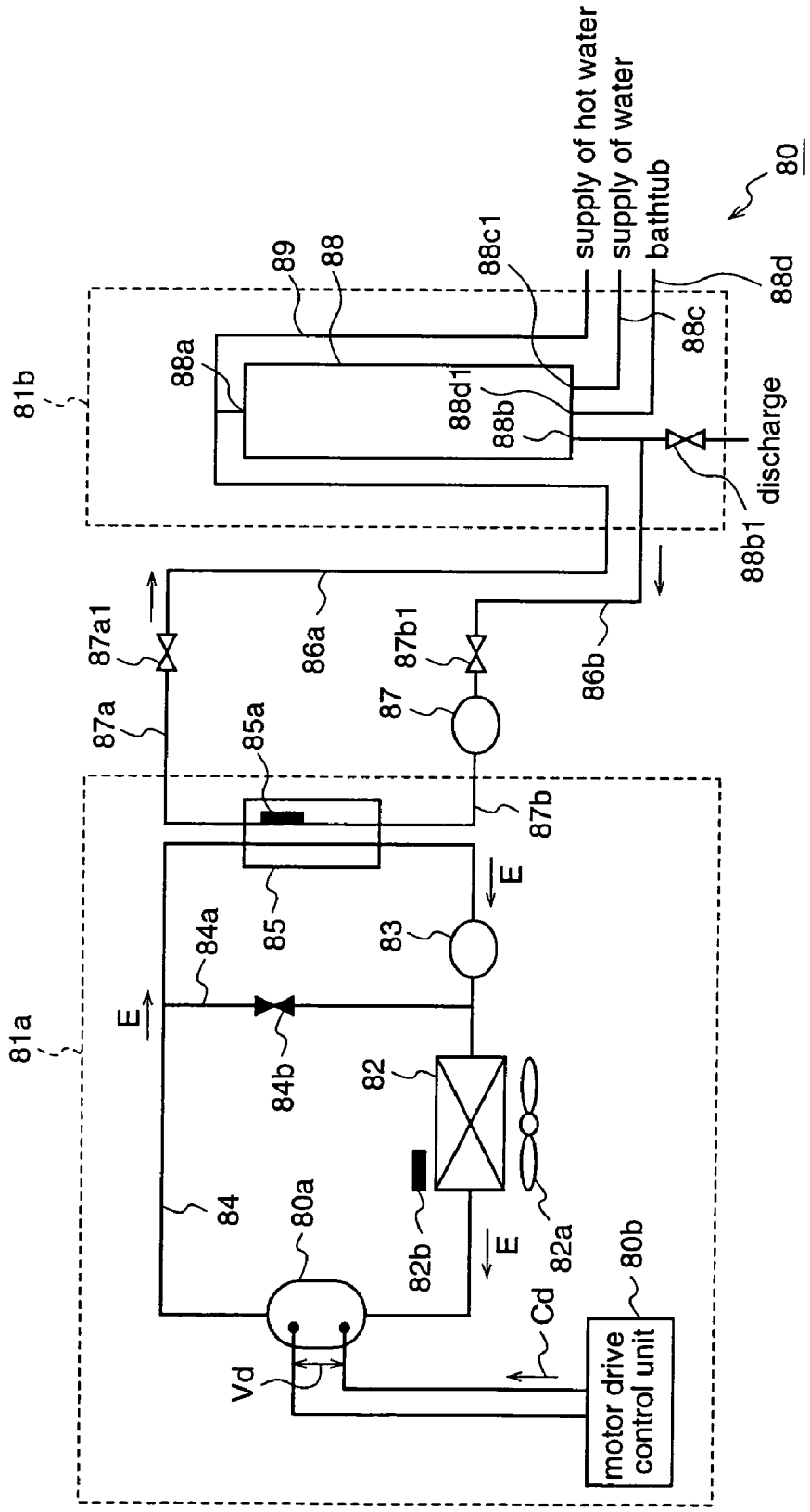
FIG. 15 is a schematic diagram for explaining a hot-water supply unit according to an eighth embodiment of the present invention.

FIG. 15 is a block diagram for explaining a hot-water supply unit according to an eighth embodiment of the present invention.

A hot-water supply unit 80 according to the eighth embodiment includes a refrigeration cycle unit 81*a* for heating supplied water to discharge hot water, a hot-water storage 81*b* in which the hot water discharged from the refrigeration cycle unit 81*a* is stored, and pipes 86*a*, 86*b*, 87*a*, and 87*b* connecting the refrigeration cycle unit 81*a* and the hot-water storage 81*b*.

The refrigeration cycle unit 81*a* comprises a linear compressor 80*a*, a compressor drive unit 80*b*, an air-refrigerant heat exchanger 82, a throttle 83, and a water-refrigerant heat exchanger 85.

The linear compressor 80*a*, the air-refrigerant heat exchanger 82, the throttle 83, and the water-refrigerant heat exchanger 85 form a refrigerant circulation path.

The compressor drive unit 80*b* drives and controls a linear vibration motor (not shown) as a drive source of the linear compressor 80*a*. The linear compressor 80*a* is identical to the linear compressor 40 having the linear vibration motor 46 according to the fourth embodiment. Further, the compressor drive unit 80*b* is identical in construction to the motor drive control apparatus 104 of the fourth embodiment, and the compressor drive unit 80*b* is hereinafter referred to as a motor drive control unit 80*b*.

The throttle 83 reduces the flow rate of the fluid refrigerant sent from the water-refrigerant heat exchanger 85 to the air-refrigerant heat exchanger 82 to expand the fluid refrigerant.

The water-refrigerant heat exchanger 85 heats up the water supplied to the refrigeration cycle unit 81*a*, and has a temperature sensor (condensation temperature sensor) 85*a* for detecting the temperature of the heated water (hot water). The air-refrigerant heat exchanger 82 absorbs heat from the ambient atmosphere, and has an air blower 82*a* for increasing the efficiency of heat exchange, and a temperature sensor 82*b* for detecting the ambient temperature.

In FIG. 15, reference numeral 84 denotes a refrigerant pipe for circulating the refrigerant along the refrigerant circulation path that is formed by the linear compressor 80*a*, the water-refrigerant heat exchanger 85, the throttle 83, and the air-refrigerant heat exchanger 82. A bypass pipe (defrost bypass line) 84*a* for supplying the refrigerant discharged from the linear compressor 80*a* to the air-refrigerant heat exchanger 82, bypassing the water-refrigerant heat exchanger 85 and the throttle 83, is connected to the refrigerant pipe 84, and a valve (defrost bypass valve) 84*b* is provided in a portion of the bypass pipe 84*a*.

The hot-water storage 81*b* has a hot-water storage tank 88 for storing water or hot water. A pipe (water supply pipe) 88*c* for supplying water from the outside to the storage tank 88 is connected to a water intake port 88*c*0 of the storage tank 88, and a pipe (hot-water supply pipe) 88*d* for supplying hot-water from the storage tank 88 to a bathtub is connected to a hot-water discharge port 88*d*1 of the storage tank 88. Further, a hot-water supply pipe 89 for supplying the hot water stored in the storage tank 88 to the outside is connected to a water intake/discharge port 88*a* of the storage tank 88.

The storage tank 88 and the water-refrigerant heat exchanger 85 of the refrigeration cycle unit 81*a* are connected by pipes 86*a*, 86*b*, 87*a*, and 87*b*, and a water circulation path is formed between the storage tank 88 and the water-refrigerant heat exchanger 85.

The water supply pipe 86*b* is a pipe for supplying water from the storage tank 88 to the water-refrigerant heat exchanger 85, and an end of this pipe is connected to a water discharge port 88*b* of the storage tank 88 while the other end is connected to a water intake side pipe 87*b* of the water-refrigerant heat exchanger 85 through a joint 87*b*1. Further, a discharge valve 88*b*1 for discharging the water or hot water stored in the storage tank 88 is fixed to an end of the water supply pipe 86*b*. The water supply pipe 86*a* is a pipe for returning the water from the water-refrigerant heat exchanger 85 to the storage tank 88, and an end of this pipe is connected to the water intake/discharge port 88*a* of the storage tank 88 while the other end is connected to a discharge side pipe 87*a* of the water-refrigerant heat exchanger 85 through a joint 87*a*1.

A pump 87 for circulating the water in the water circulation path is provided in a portion of the water intake side pipe 87*b* of the water-refrigerant heat exchanger 135.

Next, the operation of the hot-water supply unit 80 will be described.

When a driving current Cd and a driving voltage Vd are supplied from the motor drive control unit 80*b* to the linear vibration motor (not shown) of the linear compressor 80*a* to drive the linear compressor 80*a*, the high-temperature refrigerant compressed by the linear compressor 80*a* circulates in the direction of arrow E, i.e., the compassed refrigerant passes through the refrigerant pipe 84, to be supplied to the water-refrigerant heat exchanger 85. Further, when the pump 87 in the water circulation path is driven, water is supplied from the storage tank 88 to the water-refrigerant heat exchanger 85.

In the water-refrigerant heat exchanger 85, heat exchange is carried out between the refrigerant and the water supplied from the storage tank 88, whereby heat moves from the refrigerant to the water. That is, the supplied water is heated, and the heated water (hot water) is supplied to the storage tank 88. At this time, the temperature of the heated water (hot water) is observed by the condensation temperature sensor 85*a*.

Further, in the water-refrigerant heat exchanger 85, the refrigerant is condensed by the above-mentioned heat exchange, and the flow rate of the condensed fluid refrigerant is reduced by the throttle 83, whereby the refrigerant is expanded and sent to the air-refrigerant heat exchanger 82. In the hot-water supply unit 80, the air-refrigerant heat exchanger 82 serves as an evaporator. That is, the air-refrigerant heat exchanger 82 absorbs heat from the outside air that is sent by the air blower 82*b* to evaporate the low-temperature fluid refrigerant. At this time, the temperature of the ambient atmosphere of the air-refrigerant heat exchanger 82 is observed by the temperature sensor 82*b*.

Further, in the refrigeration cycle unit 81*a*, when the air-refrigerant heat exchanger 82 is frosted, the defrost bypass valve 84*b* opens, and the high-temperature refrigerant is supplied to the air-refrigerant heat exchanger 82 through the defrost bypass line 84*a*. Thereby, the air-refrigerant heat exchanger 82 is defrosted.

On the other hand, the hot water is supplied from the water-refrigerant heat exchanger 85 of the refrigeration cycle unit 81*a* to the hot-water storage 81*b* through the pipes 87*a* and 86*a*, and the supplied hot water is stored in the storage tank 88. The hot water in the storage tank 88 is supplied to the outside through the hot-water supply pipe 89 as required. Especially when the hot water is supplied to a bathtub, the hot water in the storage tank 88 is supplied to the bathtub through a hot-water supply pipe 140 for the bathtub.

Further, when the amount of water or hot water stored in the storage tank 88 becomes lower than a predetermined amount, water is supplied from the outside through the water supply pipe 88*c*.

As described above, in the hot-water supply unit 80 according to the eighth embodiment, since the compressor (linear compressor) 80*a* having the linear vibration motor as a power source is used as a compressor for compressing and circulating the refrigerant in the refrigeration cycle unit 81*a*, friction loss in the compressor is reduced as compared with a hot-water supply unit using a compressor having a rotation-type motor as a power source, and furthermore, the ability of the compressor for sealing the refrigerant is enhanced, resulting an increase in efficiency of the compressor.

Furthermore, in the hot-water supply unit 80 using the linear compressor as a compressor of the refrigeration cycle unit according to the eighth embodiment, since friction loss in the compressor is reduced, the amount of waste oil (spent lubricating oil) and the amount of refrigerant to be filled in the compressor are reduced, as in the air conditioner 50 of the fifth embodiment. Therefore, the hot-water supply unit 80 can contribute to conservation of the global environment.

Further, in this eighth embodiment, the frequency ω of the AC current as the driving current of the linear vibration motor is determined so that the supply voltage Pa calculated from the driving current Cd and the driving voltage Vd becomes maximum, under the state where the amplitude value i of the AC current is maintained at the target amplitude value i". Therefore, as in the fifth embodiment, the linear vibration motor can be driven and controlled with a high efficiency regardless of load fluctuations in the compressor, without the necessity of incorporating a sensor, which undesirably leads to increases in size and cost, and unnecessary restrictions such as securing operation reliability of the sensor.

Ninth Embodiment

Figure 16:
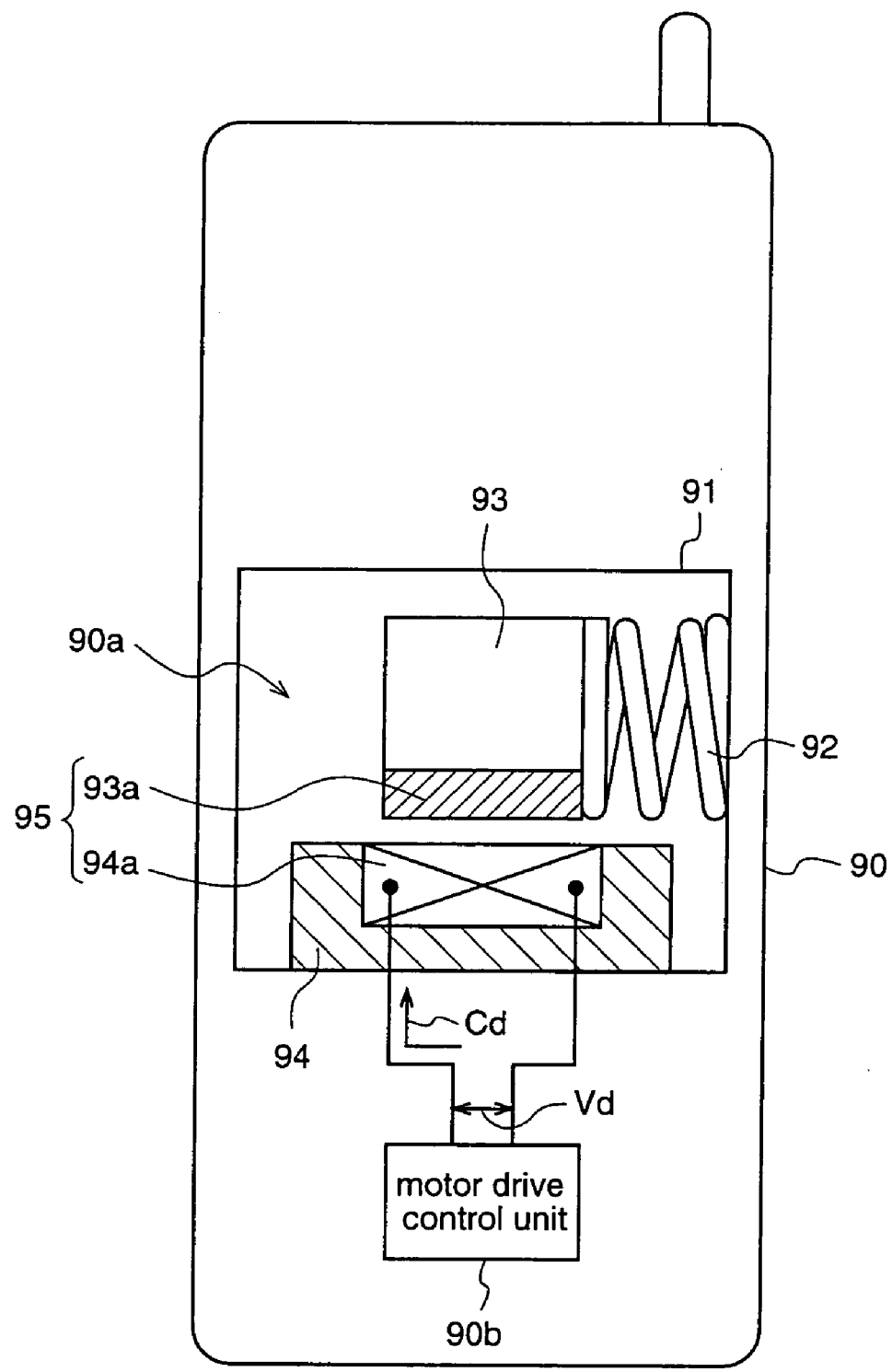
FIG. 16 is a schematic diagram for explaining a handy phone according to a ninth embodiment of the present invention.

FIG. 16 is a block diagram for explaining a handy phone according to a ninth embodiment of the present invention.

A handy phone 90 of this ninth embodiment has a vibrator 90*a* that mechanically vibrates, and a drive unit 90*b* for driving the vibrator 90*a*. The handy phone 90 informs an incoming call or the like to the user by vibration.

The vibrator 90*a* is provided with a weight member 93 that is placed in a case 91 and is vibratably supported by a spring member 92, a magnet 93*a* fixed to a portion of the weight member 93, and a stator 94 that is placed in the case 91 to be opposed to the magnet 93*a* of the weight member 93. A coil 94*a* is embedded in the stator 94. A linear vibration motor 95 is constituted by the magnet 93*a* fixed to the weight member 93, and the coil 94*a* embedded in the stator 94. In this linear vibration motor 95, the weight member 93 reciprocates in the expansion direction of the spring member 92 by an electromagnetic power generated between the coil 94*a* and the magnet 93*a*, and elasticity of the spring member 92.

The drive unit 90*b* supplies a driving current Cd and a driving voltage Vd to the linear vibration motor 95 of the vibrator 90*a*, and the drive unit 90*b* is hereinafter referred to as a motor drive control unit 90*b*. The motor drive control unit 90b includes a power supply 1, an inverter 2, a supply current detector 3, a supply voltage detector 4, a supply power calculator 5, a driving frequency determining unit 6c, a supply current amplitude determining unit 7, a comparative current waveform creation unit 8, and an inverter controller 9, similar to the motor drive control apparatus 103 of the third embodiment shown in FIG. 8. Further, the motor drive control unit 90b calculates a supply power Pa to the linear vibration motor 95 on the basis of the supply current Cd and the applied voltage Vd to the linear vibration motor 95, and determines a frequency ω of the AC current Cd so that the calculated supply power Pa becomes maximum, while maintaining an amplitude value i of the AC current as the supply current Cd at a target amplitude value i".

In the handy phone 90 so constructed, when receiving a call, power is supplied from the motor drive control unit 90b to the linear vibration motor 95 of the vibrator 90a, and the weight member 93 reciprocates in the expansion direction of the spring member 92, whereby the vibrator 90a is vibrated.

That is, when the AC current Cd is applied to the coil 94a, an AC magnetic field is generated in the stator 94, and the magnetic field attracts the magnet 93a, whereby the magnet 93a and the weight member 93 to which the magnet 93a is fixed start to reciprocate.

Under the state where the vibrator 90a is operating, the supply current Cd and the applied voltage Vd to the linear vibration motor 95 as a drive source of the vibrator 90a are detected, and the supply power Pa to the linear vibration motor 95 is calculated on the basis of the detected supply current Cd and applied voltage Vd. Further, the frequency ω of the AC current as the supply current Cd is determined so that the calculated supply power Pa becomes maximum, under the state where the amplitude value i of the AC current Cd is maintained at the target amplitude value i".

When the frequency of the AC current Cd is determined and the vibrating state of the vibrator 90a goes into the resonance state where the number of vibrations in the reciprocating motion of the weight member 93 matches the resonance frequency of the spring member 92 that supports the weight member, the reciprocating motion of the weight member 93 is accelerated, and thereby the vibration of the vibrator 90a is increased.

The handy phone 90 generates grate vibrations by bringing the vibrator 90a into the resonance state of the linear vibration motor 95, thereby to inform an incoming call to the user.

As described above, in the handy phone 90 according to the ninth embodiment, since mechanical vibrations are generated by the linear vibration motor 95, the mechanical vibrations can be varied with two degrees of freedom, i.e., the number of vibrations and the amplitude (size of vibrations), as compared with the case where vibrations are generated by a rotation-type motor, whereby the vibrator 91 which informs an incoming call or the like to the user by vibrations can generate a variety of vibrations.

Further, there is a possibility that the resonance frequency of the linear vibration motor may change depending on the situation where the handy phone is placed, for example, the situation where load to vibration is small because the handy phone is put on a desk or the like, or the situation where load to vibration is large because the handy phone is put in a pocket or the like. In this ninth embodiment, however, the frequency ω of the AC current as the driving current of the linear vibration motor is determined so that the calculated supply voltage Pa becomes maximum, under the state where the amplitude value i of the AC current is maintained at the target amplitude value i". Therefore, the resonance frequency of the linear vibration motor according to load fluctuations can be detected without using a position sensor.

As a result, the linear vibration motor can be driven and controlled with high efficiency regardless of load fluctuations in the vibrator 91, without the necessity of incorporating a sensor, which undesirably leads to increases in size and cost of the handy phone, and unnecessary restrictions such as securing operation reliability of the sensor.

In this ninth embodiment, the linear vibration motor and the drive control apparatus thereof according to the third embodiment are used as a vibrator for informing an incoming call in a handy phone by vibration, and a drive control unit thereof, respectively. In addition, the linear vibration motor and the drive control apparatus thereof may be used as a power source of a reciprocation-type electric razor and a drive control unit thereof, respectively.

Moreover, while the motor drive control units in the fifth to ninth embodiments have the same construction as the motor drive control apparatus 103 according to the third embodiment, the motor drive control units may have the same construction as the motor drive control apparatus 101 according to the first embodiment or the motor drive control apparatus 102 according the second embodiment.

The invention claimed is:

1. A motor drive control apparatus for driving and controlling a linear vibration motor having a stator and a mover, the mover being supported by a spring so as to form a spring vibration system including the mover, said motor drive control apparatus comprising:
   a voltage output unit for outputting an AC driving voltage to the linear vibration motor;
   a current detector for detecting an AC driving current supplied to the linear vibration motor;
   a current waveform creation unit for creating a first AC current waveform to be a reference of the driving current, on the basis of the operating conditions of the linear vibration motor; and
   a controller for controlling the driving voltage of the linear vibration motor which is output from said voltage output unit, so as to reduce a difference between the first AC current waveform and a second AC current waveform which is a result of detection by said current detector;
   wherein said controller is operable to adjust a frequency of the AC driving current so as to be close to a resonance driving frequency of the linear vibration motor, according to an amplitude value or an effective value of the first AC current waveform while performing a control of the AC driving current.

2. A motor drive control apparatus as defined in claim 1, wherein said controller is operable to adjust the amplitude value or effective value of the first AC current waveform so that the amplitude value or effective value of the second AC current waveform is kept constant, and simultaneously, adjust the frequency of the second AC current waveform so that the amplitude value or effective value of the first AC current waveform becomes maximum.

3. A motor drive control apparatus as defined in claim 2, wherein
   said controller is operable to drive and control the linear vibration motor by repeatedly performing a voltage determining process for determining the driving voltage of the linear vibration motor on the basis of a difference between the first AC current waveform and a second AC current waveform, a first current adjusting process for adjusting the first AC current waveform, and a second current adjusting process for adjusting the second AC current waveform, respectively;

the first current adjusting process has a cycle that is longer than or equal to a cycle with which the voltage determining process is repeated, and adjusts the amplitude value or effective value of the first AC current waveform so that the amplitude value or effective value of the second AC current waveform is kept constant; and the second current adjusting process has a cycle that is longer than or equal to a cycle with which the first current adjusting process is repeated, and adjusts the frequency of the second AC current waveform so that the amplitude value or effective value of the first AC current waveform becomes maximum.

4. A motor drive control apparatus as defined in claim 3, wherein the first current adjusting process changes a target value of the amplitude value or effective value of the second AC current waveform that is kept constant, in accordance with the operating conditions of the linear vibration motor.

5. A motor drive control apparatus as defined in claim 1, wherein said controller is operable to adjust the frequency of the second AC current waveform so that the amplitude value or effective value of the second AC current waveform approaches a value that is half the amplitude value or effective value of the first AC current waveform, while keeping the amplitude value or effective value of the first AC current waveform constant.

6. A motor drive control apparatus as defined in claim 5, wherein said controller is operable to drive and control the linear vibration motor by repeatedly performing a voltage determining process for determining a driving voltage of the linear vibration motor on the basis of a difference between the first AC current waveform and a second AC current waveform, and a current adjusting process for adjusting the second AC current waveform, respectively; and the current adjusting process has a cycle that is longer than or equal to a cycle with which the voltage determining process is repeated, and adjusts the frequency of the second AC current waveform so that the amplitude value or effective value of the second AC current waveform approaches a value that is half the amplitude value or effective value of the first AC current waveform, while keeping the amplitude value or effective value of the first AC current waveform constant.

7. A motor drive control apparatus as defined in claim 6, wherein the current adjusting process changes a target value of the amplitude value or effective value of the first AC current waveform that is kept constant, in accordance with the operating conditions of the linear vibration motor.

8. An air conditioner having first and second heat exchangers which form a circulation path for a refrigerant, and a compressor which has a cylinder and a piston and which circulates the refrigerant in the circulation path by reciprocating motions of the piston, said air conditioner including:

a linear vibration motor for making the piston reciprocate, said motor having a stator and a mover, and said mover being supported with a spring so as to form a spring vibration system including said mover; and a motor drive control unit for driving and controlling said linear vibration motor, wherein said motor drive control unit is a motor drive control apparatus as defined in claim 1.

9. A refrigerator having first and second heat exchangers which form a circulation path for a refrigerant, and a compressor which has a cylinder and a piston and which circulates the refrigerant in the circulation path by reciprocating motions of the piston, said refrigerator including:

a linear vibration motor for making the piston reciprocate, said motor having a stator and a mover, and said mover being supported with a spring so as to form a spring vibration system including said mover; and a motor drive control unit for driving and controlling said linear vibration motor, wherein said motor drive control unit is a motor drive control apparatus as defined in claim 1.

10. A cryogenic freezer having first and second heat exchangers which form a circulation path for a refrigerant, and a compressor which has a cylinder and a piston and which circulates the refrigerant in the circulation path by reciprocating motions of the piston, said cryogenic freezer including:

a linear vibration motor for making the piston reciprocate, said linear vibration motor having a stator and a mover, and said mover being supported with a spring so as to form a spring vibration system including said mover; and a motor drive control unit for driving and controlling said linear vibration motor, wherein said motor drive control unit is a motor drive control apparatus as defined in claim 1.

11. A hot-water supply unit having first and second heat exchangers which form a circulation path for a refrigerant, and a compressor which has a cylinder and a piston and which circulates the refrigerant in the circulation path by reciprocating motions of the piston, said hot-water supply unit including:

a linear vibration motor for making the piston reciprocate, said linear vibration motor having a stator and a mover, and said mover being supported with a spring so as to form a spring vibration system including said mover; and a motor drive control unit for driving and controlling said linear vibration motor, wherein said motor drive control unit is a motor drive control apparatus as defined in claim 1.

12. A handy phone having a linear vibration motor for generating vibrations, and a motor drive control unit for driving and controlling the linear vibration motor, wherein:

said linear vibration motor has a stator and a mover, and said mover is supported by a spring so as to form a spring vibration system including said mover; and said motor drive control unit is a motor drive control apparatus as defined in claim 1.

* * * * *

UNITED STATES PATENT AND TRADEMARK OFFICE
CERTIFICATE OF CORRECTION

PATENT NO. : 7,148,636 B2  Page 1 of 1
APPLICATION NO. : 10/447957
DATED : December 12, 2006
INVENTOR(S) : Mitsuo Ueda et al.

It is certified that error appears in the above-identified patent and that said Letters Patent is hereby corrected as shown below:

On the title page
Item (56), References Cited, under U.S. Patent Documents, please add
--5,947,693   9/1999   Yang--.

Title page
Item (56), References Cited, under U.S. Patent Documents, please add
--5,980,211   11/1999   Tojo et al.--.

Claim 3
In column 44, lines 58-59, please change "claim 2, wherein" to --claim 2, wherein:--.

Claim 6
In column 45, lines 28-29, please change "claim 5, wherein" to --claim 5, wherein:--.

Signed and Sealed this

Twenty-sixth Day of May, 2009

JOHN DOLL
*Acting Director of the United States Patent and Trademark Office*